United States Patent
Carney et al.

(10) Patent No.: US 10,831,012 B2
(45) Date of Patent: Nov. 10, 2020

(54) PREDICTING STRUCTURED ILLUMINATION PARAMETERS

(71) Applicant: ILLUMINA, INC., San Diego, CA (US)

(72) Inventors: Michael J. Carney, San Diego, CA (US); Stanley S. Hong, Palo Alto, CA (US); Robert Langlois, San Diego, CA (US); Hongji Ren, San Diego, CA (US); Kevin Wayne Bartig, San Diego, CA (US); Rico Otto, San Diego, CA (US); Olga Andreevna Souverneva, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 0 days.

(21) Appl. No.: 16/447,729

(22) Filed: Jun. 20, 2019

(65) Prior Publication Data
US 2020/0004004 A1    Jan. 2, 2020

Related U.S. Application Data

(60) Provisional application No. 62/692,303, filed on Jun. 29, 2018.

(51) Int. Cl.
*G02B 21/06*    (2006.01)
*G02B 21/36*    (2006.01)
(Continued)

(52) U.S. Cl.
CPC ............. *G02B 21/36* (2013.01); *G02B 21/06* (2013.01); *G02B 21/26* (2013.01); *G06T 7/11* (2017.01);
(Continued)

(58) Field of Classification Search
CPC ........ G02B 21/36; G02B 21/06; G02B 21/26; G06T 7/11; G06T 2207/10056; G06T 2207/20021
See application file for complete search history.

(56) References Cited

U.S. PATENT DOCUMENTS 3,856,986 A    12/1974    Macovski
4,213,706 A    7/1980    Hill et al.
(Continued)

FOREIGN PATENT DOCUMENTS

CN    1292227 C    12/2006
EP    2110697    10/2009
(Continued)

OTHER PUBLICATIONS

English Translation of JP-2009098215 (Year: 2009).*
(Continued)

*Primary Examiner* — John R Schnurr
(74) *Attorney, Agent, or Firm* — Illumina, Inc.

(57) ABSTRACT

Implementations of the disclosure are directed to predicting structured illumination parameters for a particular point in time, space, and/or temperature using estimates of structured illumination parameters obtained from structured illumination images captured by a structured illumination system. Particular implementations are directed to predicting structured illumination frequency, phase, orientation, and/or modulation order parameters.

22 Claims, 14 Drawing Sheets

(51) Int. Cl.
*G06T 7/11* (2017.01)
*G02B 21/26* (2006.01)

(52) U.S. Cl.
CPC ............... *G06T 2207/10056* (2013.01); *G06T 2207/20021* (2013.01)

(56) References Cited

U.S. PATENT DOCUMENTS

| | | |
|---|---|---|
| 5,761,085 A | 6/1998 | Giorgio |
| 6,188,478 B1 | 2/2001 | Fuchs et al. |
| 6,898,004 B2 | 5/2005 | Shimizu et al. |
| 6,924,900 B2 | 8/2005 | Rinn |
| 6,947,127 B2 | 9/2005 | Wolleschensky et al. |
| 7,274,446 B2 | 9/2007 | Wolleschensky et al. |
| 7,324,214 B2 | 1/2008 | De Groot et al. |
| 7,532,323 B2 | 5/2009 | Tang et al. |
| 7,803,609 B2 | 9/2010 | Kaplan |
| 8,160,379 B2 | 4/2012 | Schaefer et al. |
| 8,222,040 B2 | 7/2012 | Hong et al. |
| 8,502,867 B2 | 8/2013 | Park |
| 8,509,879 B2 | 8/2013 | Durkin et al. |
| 8,759,077 B2 | 6/2014 | Hong et al. |
| 8,796,185 B2 | 8/2014 | Kim et al. |
| 8,817,362 B2 | 8/2014 | Lee |
| 8,848,199 B2 | 9/2014 | Choi et al. |
| 9,458,501 B2 | 10/2016 | Hong et al. |
| 9,465,228 B2 | 10/2016 | Lee et al. |
| 9,772,505 B2 | 9/2017 | Lee et al. |
| 10,378,053 B2 | 8/2019 | Staker et al. |
| 10,429,665 B2 | 10/2019 | Lee et al. |
| 2005/0239115 A1 | 10/2005 | Ryu et al. |
| 2005/0280832 A1 | 12/2005 | Johnson et al. |
| 2008/0158668 A1 | 7/2008 | Ouchi et al. |
| 2009/0219607 A1 | 9/2009 | Saggau et al. |
| 2009/0225407 A1 | 9/2009 | Nakayama et al. |
| 2009/0238449 A1 | 9/2009 | Zhang et al. |
| 2009/0250632 A1 | 10/2009 | Kempe et al. |
| 2011/0036996 A1 | 2/2011 | Wolleschensky et al. |
| 2011/0182529 A1* | 7/2011 | Kempe ............ G02B 21/0076 382/274 |
| 2012/0243004 A1 | 9/2012 | El Gawhary et al. |
| 2016/0273034 A1 | 9/2016 | Lundquist et al. |

FOREIGN PATENT DOCUMENTS

| | | |
|---|---|---|
| JP | 2005080181 | 3/2005 |
| JP | 2009098215 A * | 5/2009 |
| KR | 20040001590 | 1/2004 |
| TW | I417518 | 12/2013 |
| WO | 2009/100830 | 8/2009 |

OTHER PUBLICATIONS

Gustafsson et al. "Three-Dimensional Resolution Doubling in Wide-Field Fluorescence Microscopy by Structured Illumination", Biophysical Journal vol. 94 Jun. 2008 (Year: 2008).*

Frohn, et al., "Three-dimensional resolution enhancement in fluorescence microscopy by harmonic excitation," Optics Letters 26 (11), 828-830, 2001.

Frohn, et al., "True optical resolution beyond the Rayleigh limit achieved by standing wave illumination," PNAS 97 (13), 7232-7236, 2000.

Krishnamurthi, et al., "Image processing in 3D standing-wave fluorescence microscopy," Three-Dimensional Microscopy: Image Acquisition and Processing III vol. 2655, International Society for Optics and Photonics, 18-25, 1996.

* cited by examiner

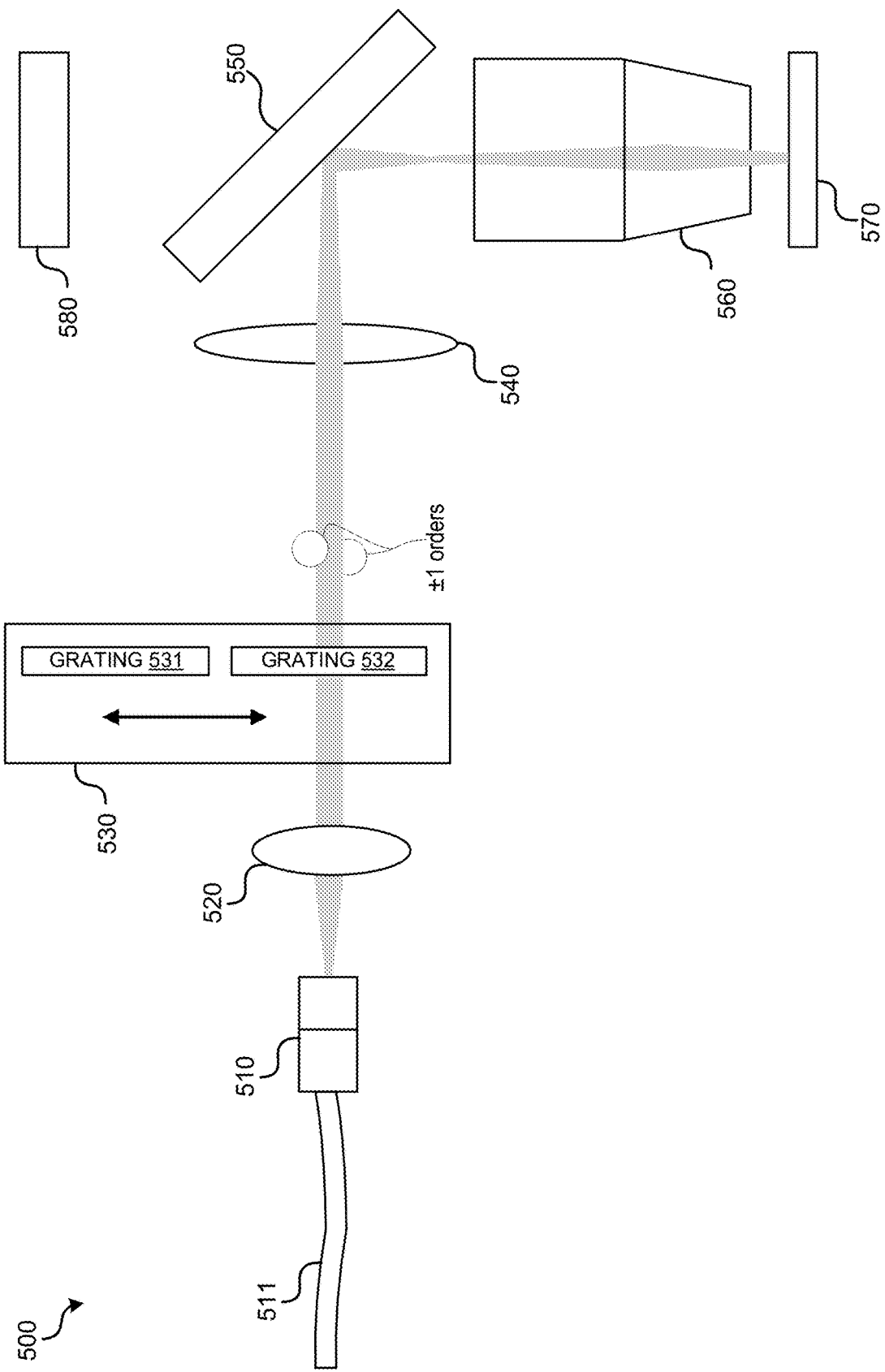

US 10,831,012 B2

PREDICTING STRUCTURED ILLUMINATION PARAMETERS

CROSS-REFERENCE TO RELATED APPLICATIONS

The present application claims the benefit of U.S. Provisional Patent Application No. 62/692,303 filed on Jun. 29, 2018 and titled "PREDICTING STRUCTURED ILLUMINATION PARAMETERS."

BACKGROUND

Structured illumination microscopy (SIM) describes a technique by which spatially structured (i.e., patterned) light may be used to image a sample to increase the lateral resolution of the microscope by a factor of two or more. In some instances, during imaging of the sample, three images of fringe patterns of the sample are acquired at various pattern phases (e.g., 0°, 120°, and 240°), so that each location on the sample is exposed to a range of illumination intensities, with the procedure repeated by rotating the pattern orientation about the optical axis to 3 separate angles (e.g. 0°, 60° and 120°). The captured images (e.g., nine images) may be assembled into a single image having an extended spatial frequency bandwidth, which may be retransformed into real space to generate an image having a higher resolution than one captured by a conventional microscope.

In some implementations of current SIM systems, a linearly polarized light beam is directed through an optical beam splitter that splits the beam into two or more separate orders that may be combined and projected on the imaged sample as an interference fringe pattern with a sinusoidal intensity variation. Diffraction gratings are examples of beam splitters that can generate beams with a high degree of coherence and stable propagation angles. When two such beams are combined, the interference between them can create a uniform, regularly-repeating fringe pattern where the spacing is determined by factors including the angle between the interfering beams.

During capture and/or subsequent assembly or reconstruction of images into a single image having an extended spatial frequency bandwidth, the following structured illumination parameters may need to be considered: the spacing between adjacent fringes (i.e., frequency of fringe pattern), the phase or angle of the structured illumination pattern, and the orientation of the fringe pattern relative to the illuminated sample. In an ideal imaging system, not subject to factors such as mechanical instability and thermal variations, each of these parameters would not drift or otherwise change over time, and the precise SIM frequency, phase, and orientation parameters associated with a given image sample would be known. However, due to factors such as mechanical instability of an excitation beam path and/or thermal expansion/contraction of an imaged sample, these parameters may drift or otherwise change over time.

As such, a SIM imaging system may need to estimate structured illumination parameters to account for their variance over time. As many SIM imaging systems do not perform SIM image processing in real-time (e.g., they process captured images offline), such SIM systems may spend a considerable amount of computational time to process a SIM image to estimate structured illumination parameters for that image.

SUMMARY

Implementations of the disclosure are directed to predicting structured illumination parameters for a particular point in time, space, and/or temperature using estimates of structured illumination parameters obtained from structured illumination images captured by a structured illumination system.

In one example, a method comprises: using a structured illumination system to capture a first image of a sample; using a computing device to estimate a first structured illumination parameter using at least the captured first image; using the structured illumination system to capture a second image of the sample; using the computing device to estimate a second structured illumination parameter using at least the captured second image; and using at least the first structured illumination parameter or the second structured illumination parameter, using the computing device to predict a third structured illumination parameter corresponding to a third image. Each of the first, second, and third structured illumination parameters may comprise a phase, frequency, orientation, or modulation order.

In some implementations, the first image is captured at a first time, the second image is captured at a second time after the first time, the third image is captured at a third time between the first time and the second time, and the third structured illumination parameter is predicted at the third time by using at least an interpolation method. The interpolation method may comprise: using the computing device to determine a rate of change from the first structured illumination parameter at the first time to the second structured illumination at the second time; and using at least the determined rate of change, using the computing device to predict the third structured illumination parameter at the third time.

In some implementations, the method further comprises: using the computing device to construct a high resolution image using at least the third image and the third structured illumination parameter.

In some implementations: the first image is captured at a first time, the second image is captured at a second time after the first time, the third image is captured at a third time after or before both the first time and the second time, and the third structured illumination parameter is predicted at the third time by using at least an extrapolation method.

In some implementations, the method further comprises: using at least the third structured illumination parameter to adjust a hardware component of the structured illumination system to compensate for changes in a structured illumination parameter prior to capturing the third image at the third time. Adjusting a hardware component may comprise: adjusting one or more of: a rotating mirror to adjust a phase or orientation of a structured illumination pattern, a translation stage carrying a diffraction grating to adjust a phase or orientation of a structured illumination pattern, and a sample translation stage to adjust a phase or orientation of a structured illumination pattern.

In some implementations, the method further comprises: storing in a memory of the structured illumination system: the first structured illumination parameter, the second structured illumination parameter, and the third structured illumination parameter; and using one or more of the stored first structured illumination, stored second structured illumination parameter, stored third structured illumination parameter, and a stored value based on the known physical characteristics of the structured illumination system to reduce a search space for a fourth structured illumination parameter for a fourth image.

In some implementations, predicting the third structured illumination parameter corresponding to the third image comprises: applying a least-squares fit to at least the first structured illumination parameter and the second structured illumination parameter. In some implementations, predicting the third structured illumination parameter corresponding to the third image comprises: using the second structured illumination parameter.

In some implementations, the first image of the sample is captured at a first sample temperature; the first structured illumination parameter is estimated at the first sample temperature; the second image of the sample is captured at a second sample temperature; the second structured illumination parameter is estimated at the second sample temperature; and the third structured illumination parameter is predicted at a third sample temperature.

In some implementations, the method further comprises: dividing the first image of the sample into a plurality of image subsections; using the computing device to estimate a fourth structured illumination parameter using at least a first image subsection of the plurality of image subsections; using the computing device to estimate a fifth structured illumination parameter using at least a second image subsection of the plurality of image subsections; using at least the fourth structured illumination parameter or the fifth structured illumination parameter, using the computing device to predict a sixth structured illumination parameter corresponding to a third image subsection of the plurality of image subsections.

In some implementations, the method further comprises: dividing the first image of the sample into a plurality of image subsections; using the computing device to estimate a fourth structured illumination parameter using at least a first image subsection of the plurality of image subsections; and using the estimated fourth structured illumination parameter as a predicted structured illumination parameter of a second image subsection of the plurality of image subsections.

In one example, a non-transitory computer-readable medium may have executable instructions stored thereon that, when executed by a processor, cause the processor to perform operations of: using a structured illumination system to capture a first image of a sample; estimating a first structured illumination parameter using at least the captured first image; using the structured illumination system to capture a second image of the sample; estimating a second structured illumination parameter using at least the captured second image; and using at least the first structured illumination parameter or the second structured illumination parameter, predicting a third structured illumination parameter corresponding to a third image.

In some implementations, the first image is captured at a first sample position, the second image is captured at a second sample position, the third image is captured at a third sample position between the first sample position and the second sample position, and the third structured illumination parameter is predicted at the third sample position by using at least an interpolation method. The interpolation method may comprise: using the computing device to determine a rate of change from the first structured illumination parameter at the first sample position to the second structured illumination at the second sample position; and using at least the determined rate of change, predicting the third structured illumination parameter at the third sample position.

In some implementations, the instructions when executed by the processor, cause the processor to further perform an operation of: constructing a high resolution image using at least the third image and the third structured illumination parameter.

In some implementations, the third sample position is after the first sample position and the second sample position, and the third structured illumination parameter is predicted at the third sample position by using at least an extrapolation method.

In some implementations, the instructions when executed by the processor, cause the processor to further perform an operation of: using at least the third structured illumination parameter to cause a hardware component of the structured illumination system to be adjusted to compensate for changes in a structured illumination parameter prior to capturing an image at the third sample position.

In some implementations, the instructions when executed by the processor, cause the processor to further perform operations of: storing in a memory of the structured illumination system: the first structured illumination parameter, the second structured illumination parameter, and the third structured illumination parameter; and using one or more of the stored first structured illumination, stored second structured illumination parameter, stored third structured illumination parameter, and a stored value based on the known physical characteristics of the structured illumination system to reduce a search space for a fourth structured illumination parameter for a fourth image.

In one example, a structured illumination imaging system comprises: a light emitter to emit light; a beam splitter to split light emitted by the light emitter to project a structured illumination pattern on a plane of a sample; a processor; and a non-transitory computer-readable medium having executable instructions stored thereon that, when executed by the processor, cause the processor to perform operations of: capturing a first image of a sample; estimating a first structured illumination parameter using at least the captured first image; capturing a second image of the sample; estimating a second structured illumination parameter using at least the captured second image; and using at least the first structured illumination parameter or the second structured illumination parameter, predicting a third structured illumination parameter corresponding to a third image.

In one example, a method comprises: using a structured illumination system to capture a first plurality of images of a sample; using a computing device to estimate a first structured illumination parameter using at least the captured first plurality of images; using the structured illumination system to capture a second plurality of images of the sample; using the computing device to estimate a second structured illumination parameter using at least the captured second plurality of images; and using at least the first structured illumination parameter or the second structured illumination parameter, using the computing device to predict a third structured illumination parameter corresponding to one or more images.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more implementations, is described in detail with reference to the following figures. The figures are provided for purposes of illustration only and merely depict example implementations. Furthermore, it should be noted that for clarity and ease of illustration, the elements in the figures have not necessarily been drawn to scale.

Some of the figures included herein illustrate various implementations of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

FIG. 5B is a schematic diagram illustrating an example optical configuration of a dual optical grating slide SIM imaging system that may implement structured illumination parameter prediction, in accordance with some implementations described herein.

Figure 1A:
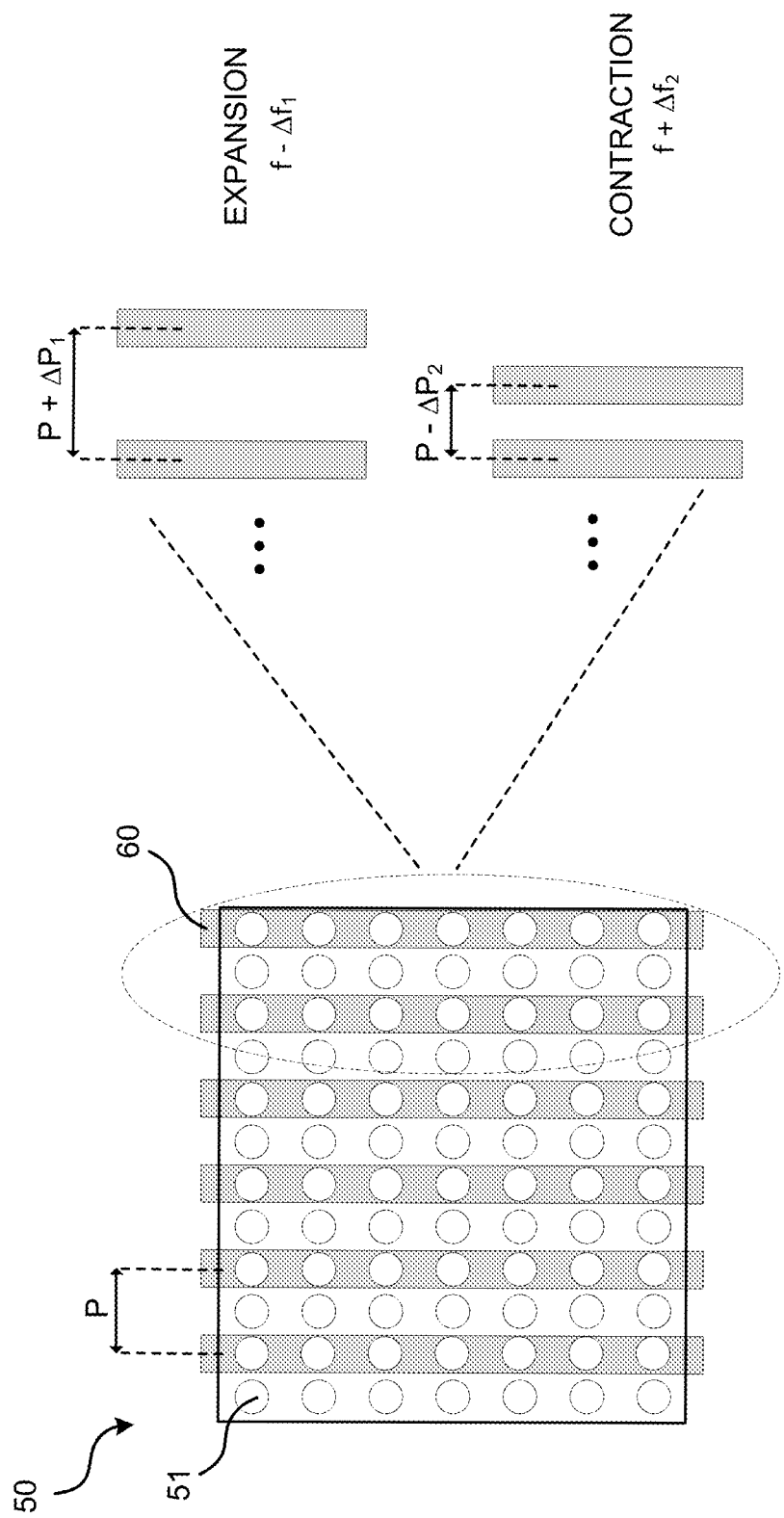
FIG. 1A illustrates, in one example, undesired changes in frequency that may occur over time in a SIM imaging system that projects a 1D structured illumination pattern on a sample.

The figures are not exhaustive and do not limit the present disclosure to the precise form disclosed.

DETAILED DESCRIPTION

As used herein to refer to a structured illumination parameter, the term "frequency" is intended to refer to a spacing between fringes or lines of a structured illumination pattern (e.g., fringe or grid pattern). For example, a pattern having a greater spacing between fringes will have a lower frequency than a pattern having a lower spacing between fringes.

As used herein to refer to a structured illumination parameter, the term "phase" is intended to refer to a phase of a structured illumination pattern illuminating a sample. For example, a phase may be changed by translating a structured illumination pattern relative to an illuminated sample.

As used herein to refer to a structured illumination parameter, the term "orientation" is intended to refer to a relative orientation between a structured illumination pattern (e.g., fringe or grid pattern) and a sample illuminated by the pattern. For example, an orientation may be changed by rotating a structured illumination pattern relative to an illuminated sample.

As used herein to refer to a structured illumination parameter, the terms "predict" or "predicting" are intended to mean calculating the value(s) of the parameter without directly measuring the parameter or estimating the parameter from a captured image corresponding to the parameter. For example, a phase of a structured illumination pattern may be predicted at a time t1 by interpolation between phase values directly measured or estimated (e.g., from captured phase images) at times t2 and t3 where t2<t1<t3. As another example, a frequency of a structured illumination pattern may be predicted at a time t1 by extrapolation from frequency values directly measured or estimated (e.g., from captured phase images) at times t2 and t3 where t2<t3<t1.

As used herein to refer to light diffracted by a diffraction grating, the term "order" or "order number" is intended to mean the number of integer wavelengths that represents the path length difference of light from adjacent slits or structures of the diffraction grating for constructive interference. The interaction of an incident light beam on a repeating series of grating structures or other beam splitting structures can redirect or diffract portions of the light beam into predictable angular directions from the original beam. The term "zeroth order" or "zeroth order maximum" is intended to refer to the central bright fringe emitted by a diffraction grating in which there is no diffraction. The term "first-order" is intended to refer to the two bright fringes diffracted to either side of the zeroth order fringe, where the path length difference is ±1 wavelengths. Higher orders are diffracted into larger angles from the original beam. The properties of the grating can be manipulated to control how much of the beam intensity is directed into various orders. For example, a phase grating can be fabricated to maximize the transmission of the ±1 orders and minimize the transmission of the zeroth order beam.

As used herein to refer to a sample, the term "feature" is intended to mean a point or area in a pattern that can be distinguished from other points or areas according to relative location. An individual feature can include one or more molecules of a particular type. For example, a feature can include a single target nucleic acid molecule having a particular sequence or a feature can include several nucleic acid molecules having the same sequence (and/or complementary sequence, thereof).

As used herein, the term "xy plane" is intended to mean a 2-dimensional area defined by straight line axes x and y in a Cartesian coordinate system. When used in reference to a detector and an object observed by the detector, the area can be further specified as being orthogonal to the beam axis, or the direction of observation between the detector and object being detected.

As used herein, the term "z coordinate" is intended to mean information that specifies the location of a point, line or area along an axis that is orthogonal to an xy plane. In particular implementations, the z axis is orthogonal to an area of an object that is observed by a detector. For example, the direction of focus for an optical system may be specified along the z axis.

As used herein, the term "optically coupled" is intended to refer to one element being adapted to impart light to another element directly or indirectly.

Figure 1B:
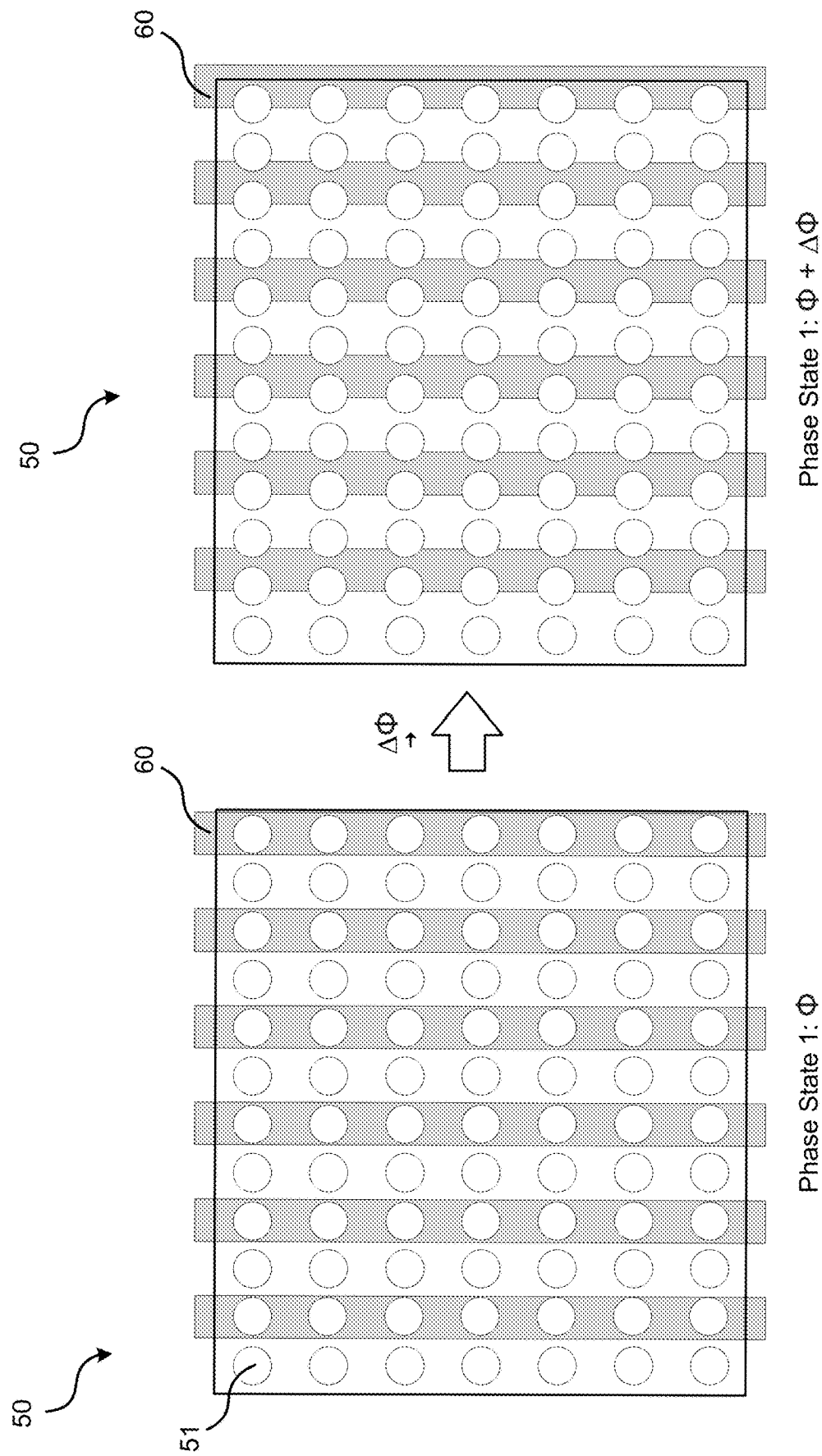
FIG. 1B illustrates, in one example, undesired changes in phase that may occur over time in a SIM imaging system that projects a 1D structured illumination pattern on a sample.
Figure 1C:
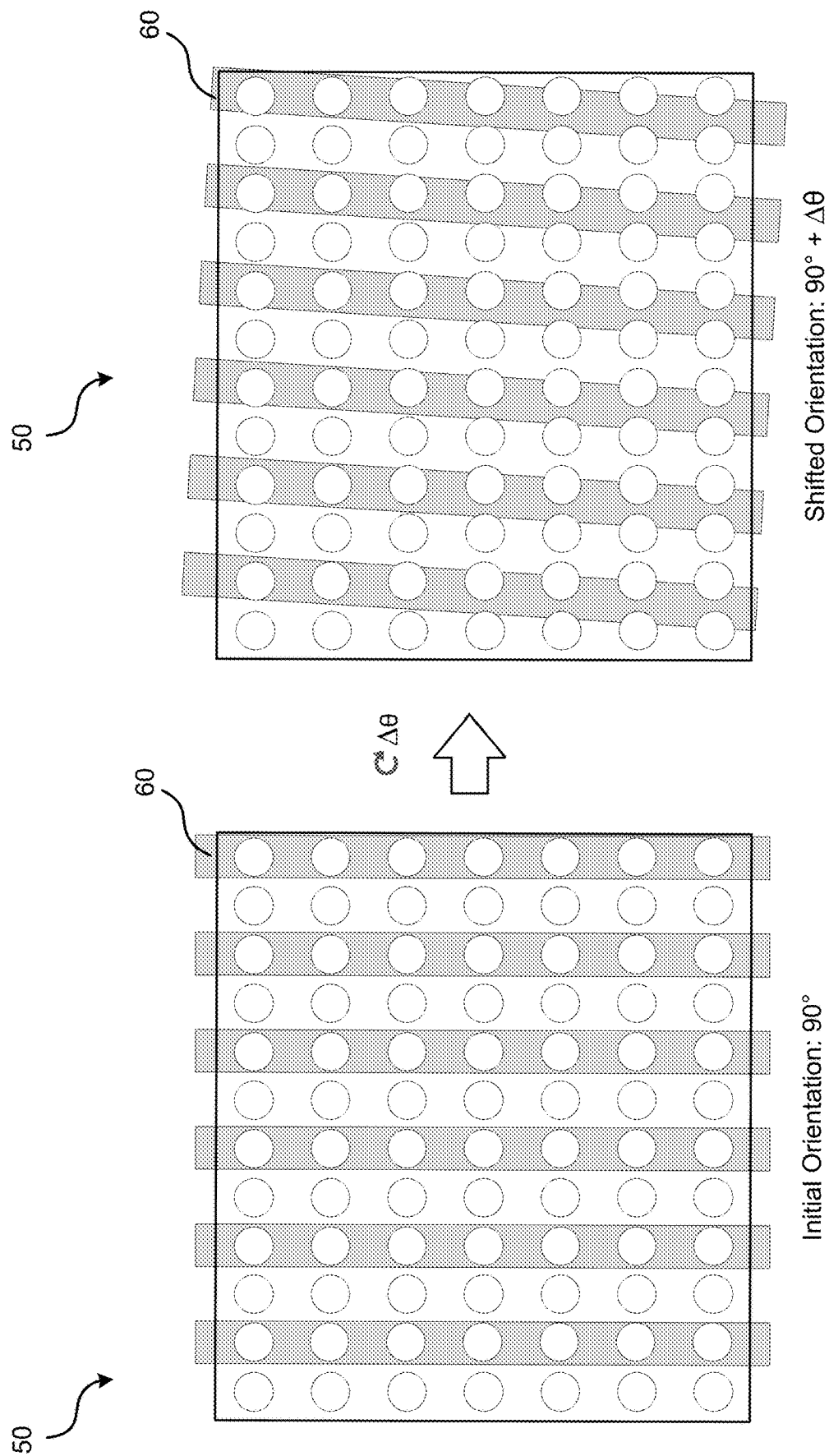
FIG. 1C illustrates, in one example, undesired changes to orientation that may occur over time in a SIM imaging system that projects a 1D structured illumination pattern on a sample.

As noted above, parameter estimation for SIM image processing may be needed to correct for undesired changes in structured illumination parameters over time. By way of example, FIGS. 1A-1C illustrate undesired changes in frequency (FIG. 1A), phase (FIG. 1B), and orientation (FIG. 1C) that may occur over time in a SIM imaging system that projects a one-dimensional structured illumination pattern on a regularly patterned sample. In particular, FIG. 1A illustrates a sample 50 with features 51 illuminated by a one-dimensional structured illumination pattern having fringes 60, before and after frequency shifts. Before any frequency shifts, adjacent fringes 60 have a pitch or center-to-center-spacing of P corresponding to an initial frequency f. Over time, with temperature variations in the system, the pitch P may increase or decrease. For example, thermal expansion may cause the pitch P to increase to $P+\Delta P_1$, correspondingly decreasing the frequency f to $f-\Delta f_1$. Conversely, thermal contraction may cause the pitch P to decrease to $P-\Delta P_1$, correspondingly increasing the frequency f to $f+\Delta f_2$.

FIG. 1B illustrates the sample 50 illuminated by a one-dimensional structured illumination pattern having fringes 60, before and after changes in a phase. As shown, before phase drift, a first phase state $\phi$ may correspond to fringes completely illuminating every second column of features 51 of sample 50. Over time, the position of the fringes 60 relative to the sample 50 may shift such that all phase images are offset by $\Delta\phi$. For example, mechanical vibrations in the SIM imaging system (e.g., in an excitation beam path), imprecision in a translation stage used by a grating or sample stage, thermal variations, and/or other factors may cause an undesired drift in the phase. After the phase drifts by $\Delta\phi$, the first phase state changes to $\phi+\Delta\phi$, and the fringes no longer are centered on every second column of features.

FIG. 1C illustrates the sample 50 illuminated by a one-dimensional structured illumination pattern having fringes 60, before and after changes in orientation. As shown, before a change in orientation, the orientation of the fringes relatively to sample 50 are completely vertical. Over the time, the orientation may change due to factors such as changes in the excitation beam path, movement of the sample, thermal variations, and/or other factors. After the orientation rotates by an angle $\Delta\theta$, the fringes are no longer completely vertical relative to the sample.

Parameter estimation during an SIM imaging process to precisely account for changes in structured illumination parameters as described above helps ensure an artifact-free and accurate reconstruction of an image from a set of sampled images. However, such a process may be computationally expensive and is frequently performed after image acquisition. For time-critical SIM imaging systems that involve real-time processing and reconstruction of images, and thus real-time estimation of parameters such as frequency, phase, orientation, and modulation order, these computational requirements may result in a loss of data throughput (e.g., less data may be processed per unit of time). In such systems, the rate at which samples are imaged may exceed the rate at which structured illumination parameters may be directly estimated from the sampled images. As such, there is a need for a method of generating a parameter estimate with low complexity and low processing time.

To this end, implementations of the technology disclosed herein are directed to predicting structured illumination parameters for a particular point in time, space, and/or temperature using estimates of structured illumination parameters obtained from images captured by the structured illumination system. Particular implementations are directed to predicting structured illumination frequency, phase, orientation, and/or modulation order parameters.

In accordance with some implementations, a structured illumination parameter may be predicted for a given point in time, space, and/or temperature by interpolating estimates of the structured illumination parameter from image captures. For example, a first frequency may be estimated from a first sampled image, a second frequency may be estimated from a second sampled image, and a frequency corresponding to a point in time between the first captured image and the second captured image (e.g., a frequency for an image taken between the first and second images) may be predicted by interpolating using at least a determined rate of change of the frequency between the first captured image and the second captured image.

In accordance with some implementations, a structured illumination parameter may be predicted for a given point in time, space, and/or temperature by extrapolation using estimates of a structured illumination parameter obtained from two image captures. For example, a first orientation may be estimated from a first sampled image, a second orientation may be estimated from a second sampled image, and an orientation corresponding to a point in time after the first and second captured images (e.g., an orientation for a third image taken after the first and second images) may be predicted by extrapolation using at least a determined rate of change of the orientation from the first captured image to the second captured image. As a second example, a first orientation may be estimated from a first sampled image, a second orientation may be estimated from a second sampled image, and an orientation corresponding to a point in time after the first and second captured images (e.g., an orientation for a third image taken after the first and second images) may be predicted by holding the value from the second captured image.

In implementations, estimated and predicted structured illumination parameters may be used to narrow a search space for other structured illumination parameters that are predicted. For example, given an estimated value of a structured illumination parameter for a first point in time, space, and/or temperature, a value of the structured illumination parameter for second point in time, space, and/or temperature that is near the first point in time, space, and/or temperature may be predicted taking into account the predicted or estimated value at the first point in time, space, and/or temperature.

In implementations, estimated and predicted structured illumination parameters may be stored in a memory of the structured illumination system for later use by the system. For instance, predicted and estimated parameters may be stored in a history file such as a lookup table. Predicted parameters that are stored in memory may be determined from estimated parameters, or they may be set based on the physical characteristics of the structured illumination system. For example, the nominal grid spacing of the structured illumination system may be stored. The stored parameters may thereafter be referenced to perform operations such as: calibrated image reconstruction, providing feedback to a hardware component to correct for changes in structured illumination parameters, and narrowing the search space when predicting additional structured illumination parameters.

Before describing various implementations of techniques disclosed herein for predicting structured illumination parameters, it is useful to describe example SIM imaging systems with which these techniques can be implemented. FIGS. 2-6 illustrate three such example SIM imaging systems. It should be noted that while these systems are described primarily in the context of SIM imaging systems that generate 1D illumination patterns, the technology disclosed herein may implemented with SIM imaging systems that generate higher dimensional illumination patterns (e.g., two-dimensional grid patterns).

Figure 2:
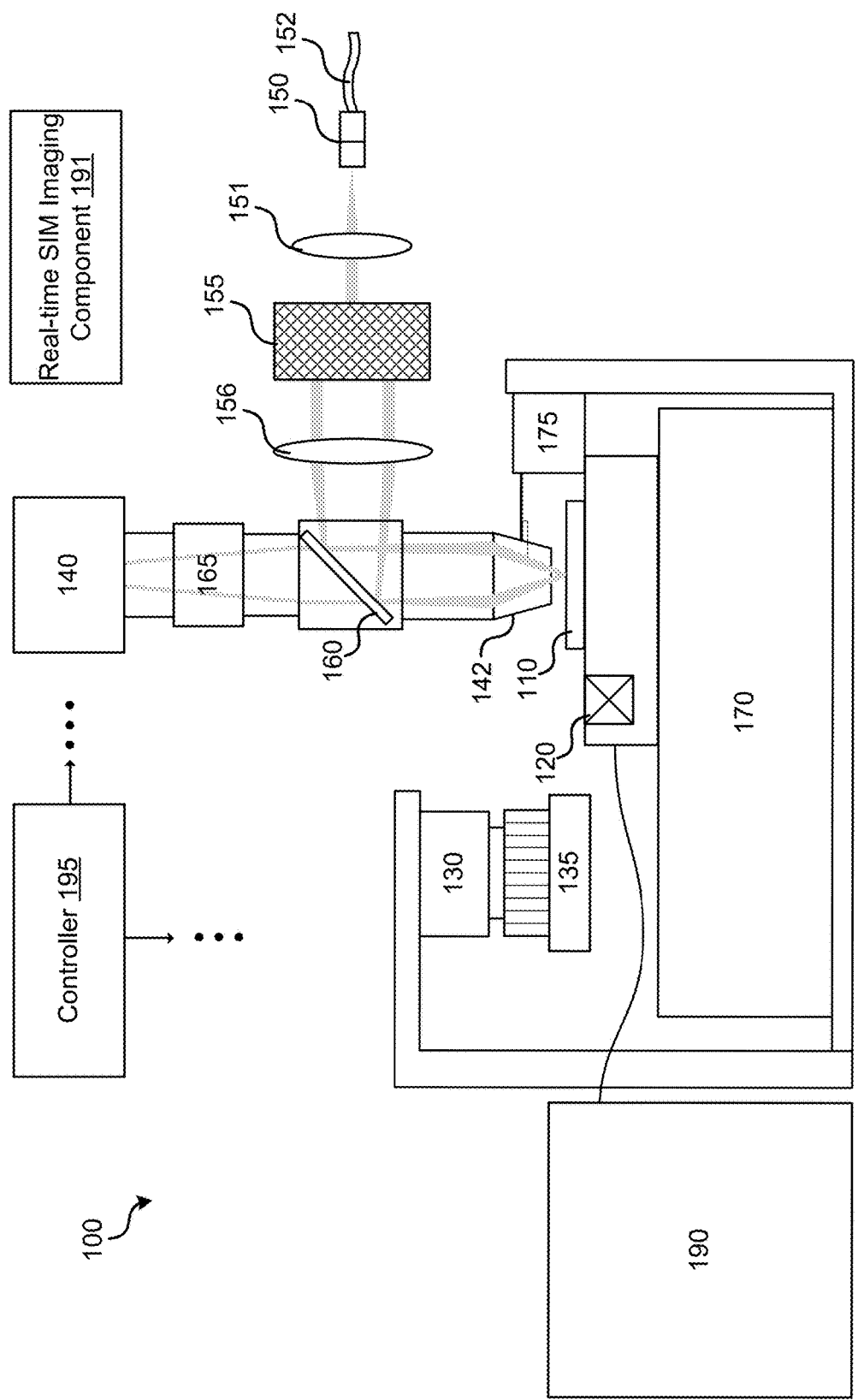
FIG. 2 illustrates, in one example, a SIM imaging system that may implement structured illumination parameter prediction in accordance with some implementations described herein.

FIG. 2 illustrates a structured illumination microscopy (SIM) imaging system 100 that may implement structured illumination parameter prediction in accordance with some implementations described herein. For example, system 100 may be a structured illumination fluorescence microscopy system that utilizes spatially structured excitation light to image a biological sample.

In the example of FIG. 2, a light emitter 150 is configured to output a light beam that is collimated by collimation lens 151. The collimated light is structured (patterned) by light structuring optical assembly 155 and directed by dichroic mirror 160 through objective lens 142 onto a sample of a sample container 110, which is positioned on a motion stage 170. In the case of a fluorescent sample, the sample fluoresces in response to the structured excitation light, and the resultant light is collected by objective lens 142 and directed to an image sensor of camera system 140 to detect fluorescence.

Light structuring optical assembly 155 includes one or more optical diffraction gratings or other beam splitting elements (e.g., a beam splitter cube or plate) to generate a pattern of light (e.g., fringes, typically sinusoidal) that is projected onto samples of a sample container 110. The diffraction gratings may be one-dimensional or two-dimensional transmissive or reflective gratings. The diffraction gratings may be sinusoidal amplitude gratings or sinusoidal phase gratings.

In some implementations, the diffraction grating(s)s may not utilize a rotation stage to change an orientation of a structured illumination pattern. In other implementations, the diffraction grating(s) may be mounted on a rotation stage. In some implementations, the diffraction gratings may be fixed during operation of the imaging system (i.e., not require rotational or linear motion). For example, in a particular implementation, further described below, the diffraction gratings may include two fixed one-dimensional transmissive diffraction gratings oriented perpendicular to each other (e.g., a horizontal diffraction grating and vertical diffraction grating).

As illustrated in the example of FIG. 2, light structuring optical assembly 155 outputs the first orders of the diffracted light beams (e.g., m=±1 orders) while blocking or minimizing all other orders, including the zeroth orders. However, in alternative implementations, additional orders of light may be projected onto the sample.

During each imaging cycle, imaging system 100 utilizes light structuring optical assembly 155 to acquire a plurality of images at various phases, with the fringe pattern displaced laterally in the modulation direction (e.g., in the x-y plane and perpendicular to the fringes), with this procedure repeated one or more times by rotating the pattern orientation about the optical axis (i.e., with respect to the x-y plane of the sample). The captured images may then be computationally reconstructed to generate a higher resolution image (e.g., an image having about twice the lateral spatial resolution of individual images).

In system 100, light emitter 150 may be an incoherent light emitter (e.g., emit light beams output by one or more excitation diodes), or a coherent light emitter such as emitter of light output by one or more lasers or laser diodes. As illustrated in the example of system 100, light emitter 150 includes an optical fiber 152 for guiding an optical beam to be output. However, other configurations of a light emitter 150 may be used. In implementations utilizing structured illumination in a multi-channel imaging system (e.g., a multi-channel fluorescence microscope utilizing multiple wavelengths of light), optical fiber 152 may optically couple to a plurality of different light sources (not shown), each light source emitting light of a different wavelength. Although system 100 is illustrated as having a single light emitter 150, in some implementations multiple light emitters 150 may be included. For example, multiple light emitters may be included in the case of a structured illumination imaging system that utilizes multiple arms, further discussed below.

In some implementations, system 100 may include a tube lens 156 that may include a lens element to articulate along the z-axis to adjust the structured beam shape and path. For example, a component of the tube lens may be articulated to account for a range of sample thicknesses (e.g., different cover glass thickness) of the sample in container 110.

In the example of system 100, fluid delivery module or device 190 may direct the flow of reagents (e.g., fluorescently labeled nucleotides, buffers, enzymes, cleavage reagents, etc.) to (and through) sample container 110 and waste valve 120. Sample container 110 can include one or more substrates upon which the samples are provided. For example, in the case of a system to analyze a large number of different nucleic acid sequences, sample container 110 can include one or more substrates on which nucleic acids to be sequenced are bound, attached or associated. The substrate can include any inert substrate or matrix to which nucleic acids can be attached, such as for example glass surfaces, plastic surfaces, latex, dextran, polystyrene surfaces, polypropylene surfaces, polyacrylamide gels, gold surfaces, and silicon wafers. In some applications, the substrate is within a channel or other area at a plurality of locations formed in a matrix or array across the sample container 110. System 100 also may include a temperature station actuator 130 and heater/cooler 135 that can optionally regulate the temperature of conditions of the fluids within the sample container 110.

In particular implementations, the sample container 110 may be implemented as a patterned flow cell including a translucent cover plate, a substrate, and a liquid contained therebetween, and a biological sample may be located at an inside surface of the translucent cover plate or an inside surface of the substrate. The flow cell may include a large number (e.g., thousands, millions, or billions) of wells or regions that are patterned into a defined array (e.g., a hexagonal array, rectangular array, etc.) into the substrate. Each region may form a cluster (e.g., a monoclonal cluster) of a biological sample such as DNA, RNA, or another genomic material which may be sequenced, for example, using sequencing by synthesis. The flow cell may be further divided into a number of spaced apart lanes (e.g., eight lanes), each lane including a hexagonal array of clusters.

Sample container 110 can be mounted on a sample stage 170 to provide movement and alignment of the sample container 110 relative to the objective lens 142. The sample stage can have one or more actuators to allow it to move in any of three dimensions. For example, in terms of the Cartesian coordinate system, actuators can be provided to allow the stage to move in the X, Y and Z directions relative to the objective lens. This can allow one or more sample locations on sample container 110 to be positioned in optical alignment with objective lens 142. Movement of sample stage 170 relative to objective lens 142 can be achieved by moving the sample stage itself, the objective lens, some other component of the imaging system, or any combination of the foregoing. Further implementations may also include moving the entire imaging system over a stationary sample. Alternatively, sample container 110 may be fixed during imaging.

In some implementations, a focus (z-axis) component 175 may be included to control positioning of the optical components relative to the sample container 110 in the focus direction (typically referred to as the z axis, or z direction). Focus component 175 can include one or more actuators physically coupled to the optical stage or the sample stage, or both, to move sample container 110 on sample stage 170 relative to the optical components (e.g., the objective lens 142) to provide proper focusing for the imaging operation. For example, the actuator may be physically coupled to the respective stage such as, for example, by mechanical, magnetic, fluidic or other attachment or contact directly or indirectly to or with the stage. The one or more actuators can be configured to move the stage in the z-direction while maintaining the sample stage in the same plane (e.g., maintaining a level or horizontal attitude, perpendicular to the optical axis). The one or more actuators can also be configured to tilt the stage. This can be done, for example, so that sample container 110 can be leveled dynamically to account for any slope in its surfaces.

The structured light emanating from a test sample at a sample location being imaged can be directed through dichroic mirror 160 to one or more detectors of camera system 140. In some implementations, a filter switching assembly 165 with one or more emission filters may be included, where the one or more emission filters can be used to pass through particular emission wavelengths and block (or reflect) other emission wavelengths. For example, the one or more emission filters may be used to switch between different channels of the imaging system. In a particular implementation, the emission filters may be implemented as dichroic mirrors that direct emission light of different wavelengths to different image sensors of camera system 140.

Camera system 140 can include one or more image sensors to monitor and track the imaging (e.g., sequencing) of sample container 110. Camera system 140 can be implemented, for example, as a charge-coupled device (CCD) image sensor camera, but other image sensor technologies (e.g., active pixel sensor) can be used.

Output data (e.g., images) from camera system 140 may be communicated to a real-time SIM imaging component 191 that may be implemented as a software application that, as further described below, may reconstruct the images captured during each imaging cycle to create an image having a higher spatial resolution. The reconstructed images may take into account changes in structure illumination parameters that are predicted over time. In addition, SIM imaging component 191 may be used to track predicted SIM parameters and/or make predictions of SIM parameters given prior estimated and/or predicted SIM parameters.

A controller 195 can be provided to control the operation of structured illumination imaging system 100, including synchronizing the various optical components of system 100. The controller can be implemented to control aspects of system operation such as, for example, configuration of light structuring optical assembly 155 (e.g., selection and/or linear translation of diffraction gratings), movement of tube lens 156, focusing, stage movement, and imaging operations. The controller may be also be implemented to control hardware elements of the system 100 to correct for changes in structured illumination parameters over time. For example, the controller may be configured to transmit control signals to motors or other devices controlling a configuration of light structuring optical assembly 155, motion stage 170, or some other element of system 100 to correct or compensate for changes in structured illumination phase, frequency, and/or orientation over time. In implementations, these signals may be transmitted in accordance with structured illumination parameters predicted using SIM imaging component 191. In some implementations, controller 195 may include a memory for storing predicted and or estimated structured illumination parameters corresponding to different times and/or sample positions.

In various implementations, the controller 195 can be implemented using hardware, algorithms (e.g., machine executable instructions), or a combination of the foregoing. For example, in some implementations the controller can include one or more CPUs, GPUs, or processors with associated memory. As another example, the controller can comprise hardware or other circuitry to control the operation, such as a computer processor and a non-transitory computer readable medium with machine-readable instructions stored thereon. For example, this circuitry can include one or more of the following: field programmable gate array (FPGA), application specific integrated circuit (ASIC), programmable logic device (PLD), complex programmable logic device (CPLD), a programmable logic array (PLA), programmable array logic (PAL) and other similar processing device or circuitry. As yet another example, the controller can comprise a combination of this circuitry with one or more processors.

Figure 3:
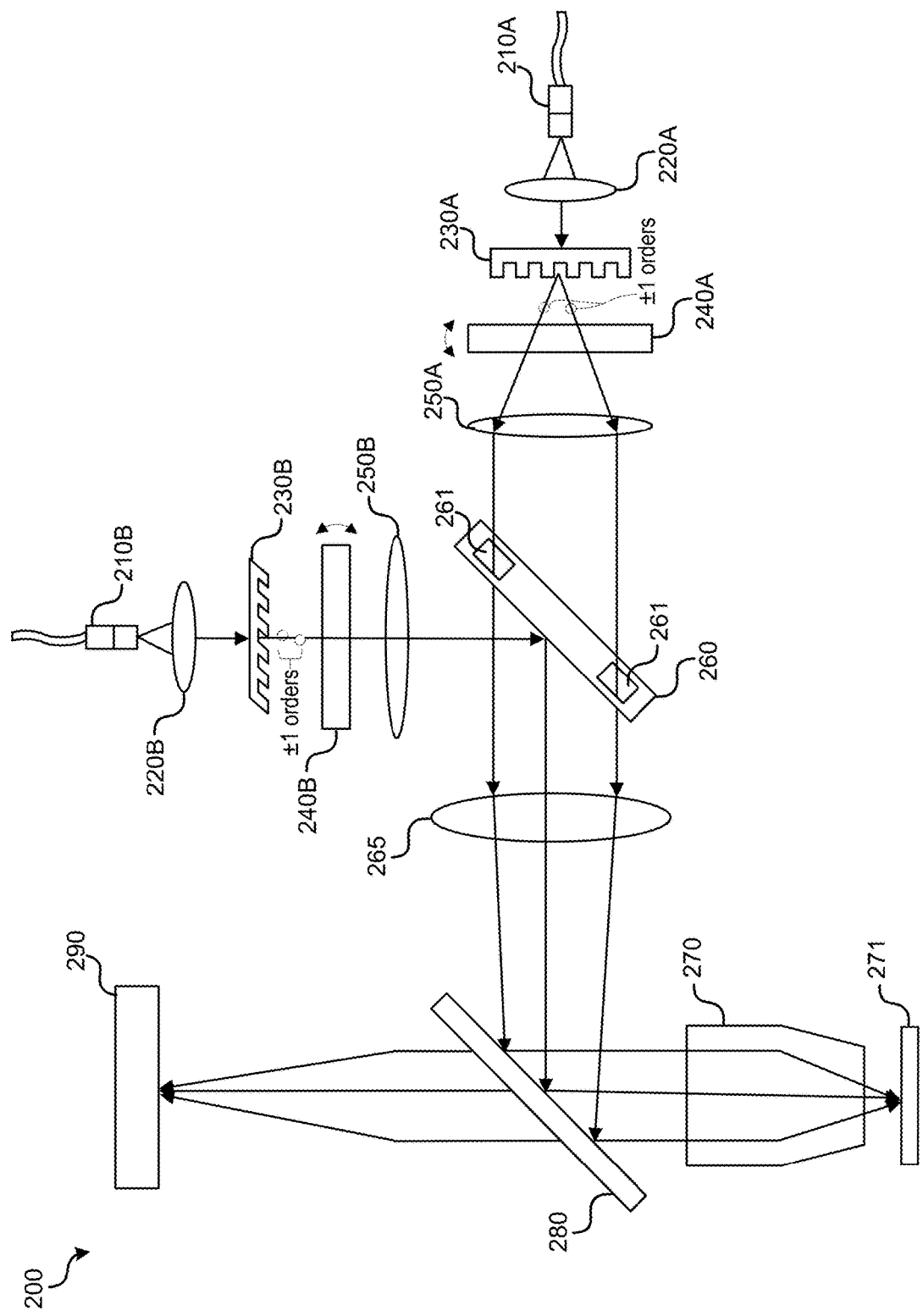
FIG. 3 is an optical diagram illustrating an example optical configuration of a two-arm SIM imaging system that may implement structured illumination parameter prediction in accordance with some implementations described herein.

FIG. 3 is an optical diagram illustrating an example optical configuration of a two-arm SIM imaging system 200 that may implement structured illumination parameter prediction in accordance with some implementations described herein. The first arm of system 200 includes a light emitter 210A, a first optical collimator 220A to collimate light output by light emitter 210A, a diffraction grating 230A in a first orientation with respect to the optical axis, a rotating mirror 240A, and a second optical collimator 250A. The second arm of system 200 includes a light emitter 210b, a first optical collimator 220B to collimate light output by light emitter 210B, a diffraction grating 230B in a second orientation with respect to the optical axis, a rotating mirror 240B, and a second optical collimator 250B. Although diffraction gratings are illustrated in this example, in other implementations, other beam splitting elements such as a beam splitter cube or plate may be used to split light received at each arm of SIM imaging system 200.

Each light emitter 210A-210B may be an incoherent light emitter (e.g., emit light beams output by one or more excitation diodes), or a coherent light emitter such as emitter of light output by one or more lasers or laser diodes. In the example of system 200, each light emitter 210A-210B is an optical fiber that outputs an optical beam that is collimated by a respective collimator 220A-220B.

In some implementations, each optical fiber may be optically coupled to a corresponding light source (not shown) such as a laser. During imaging, each optical fiber may be switched on or off using a high-speed shutter (not shown) positioned in the optical path between the fiber and the light source, or by pulsing the fiber's corresponding light source at a predetermined frequency during imaging. In some implementations, each optical fiber may be optically coupled to the same light source. In such implementations, a beam splitter or other suitable optical element may be used to guide light from the light source into each of the optical fibers. In such examples, each optical fiber may be switched on or off using a high-speed shutter (not shown) positioned in the optical path between the fiber and beam splitter.

In example SIM imaging system 200, the first arm includes a fixed vertical grating 230A to project a grating pattern in a first orientation (e.g., a vertical fringe pattern) onto the sample, and the second arm includes a fixed horizontal grating 230B to project a grating pattern in a second orientation (e.g., a horizontal fringe pattern) onto the sample 271. The gratings of SIM imaging system 200 do not need to be mechanically rotated or translated, which may provide improved system speed, reliability, and repeatability.

In alternative implementations, gratings 230A and 230B may be mounted on respective linear motion stages that may be translated to change the optical path length (and thus the phase) of light emitted by gratings 230A and 230B. The axis of motion of linear motion of the stages may be perpendicular or otherwise offset from the orientation of their respective grating to realize translation of the grating's pattern along a sample 271.

Gratings 230A-230B may be transmissive diffraction gratings, including a plurality of diffracting elements (e.g., parallel slits or grooves) formed into a glass substrate or other suitable surface. The gratings may be implemented as phase gratings that provide a periodic variation of the refractive index of the grating material. The groove or feature spacing may be chosen to diffract light at suitable angles and tuned to the minimum resolvable feature size of the imaged samples for operation of SIM imaging system 200. In other implementations, the gratings may be reflective diffraction gratings.

In the example of SIM imaging system 200, the vertical and horizontal patterns are offset by about 90 degrees. In other implementations, other orientations of the gratings may be used to create an offset of about 90 degrees. For example, the gratings may be oriented such that they project images that are offset ±45 degrees from the x or y plane of sample 271. The configuration of example SIM imaging system 200 may be particularly advantageous in the case of a regularly patterned sample 271 with features on a rectangular grid, as structured resolution enhancement can be achieved using only two perpendicular gratings (e.g., vertical grating and horizontal grating).

Gratings 230A-230B, in the example of system 200, are configured to diffract the input beams into a number of orders (e.g., 0 order, ±1 orders, ±2 orders, etc.) of which the ±1 orders may be projected on the sample 271. As shown in this example, vertical grating 230A diffracts a collimated light beam into first order diffracted beams (±1 orders), spreading the first orders on the plane of the page, and horizontal grating 230B diffracts a collimated light beam into first order diffracted beams, spreading the orders above and below the plane of the page (i.e., in a plane perpendicular to the page). To improve efficiency of the system, the zeroth order beams and all other higher order beams (i.e., ±2 orders or higher) may be blocked (i.e., filtered out of the illumination pattern projected on the sample 271). For example, a beam blocking element (not shown) such as an order filter may be inserted into the optical path after each diffraction grating to block the 0-order beam and the higher order beams. In some implementations, diffraction gratings 230A-230B may configured to diffract the beams into only the first orders and the 0-order (undiffracted beam) may be blocked by some beam blocking element.

Each arm includes an optical phase modulator or phase shifter 240A-240B to phase shift the diffracted light output by each of gratings 230. For example, during structured imaging, the optical phase of each diffracted beam may be shifted by some fraction (e.g., ½, ⅓, ¼, etc.) of the pitch ($\lambda$) of each fringe of the structured pattern. In the example of FIG. 3, phase modulators 240A and 240B are implemented as rotating windows that may use a galvanometer or other rotational actuator to rotate and modulate the optical pathlength of each diffracted beam. For example, window 240A may rotate about the vertical axis to shift the image projected by vertical grating 230A on sample 271 left or right, and window 240B may rotate about the horizontal axis to shift the image projected by horizontal grating 230B on sample 271 up or down.

In other implementations, other phase modulators that change the optical path length of the diffracted light (e.g. linear translation stages, wedges, etc.) may be used. Additionally, although optical phase modulators 240A-240B are illustrated as being placed after gratings 230A-230B, in other implementations they may be placed at other locations in the illumination system.

In alternative implementations, a single phase modulator may be operated in two different directions for the different fringe patterns, or a single phase modulator may use a single motion to adjust both of the path lengths. For example, a large, rotating optical window may be placed after mirror 260 with holes 261. In this case, the large window may be used in place of windows 240A and 240B to modulate the phases of both sets of diffracted beams output by the vertical and horizontal diffraction gratings. Instead of being parallel with respect to the optical axis of one of the gratings, the axis of rotation for the large rotating window may be offset 45 degrees (or some other angular offset) from the optical axis of each of the vertical and horizontal gratings to allow for phase shifting along both directions along one common axis of rotation of the large window. In some implementations, the large rotating window may be replaced by a wedged optic rotating about the nominal beam axis.

In example system 200, a mirror 260 with holes 261 combines the two arms into the optical path in a lossless manner (e.g., without significant loss of optical power, other than a small absorption in the reflective coating). Mirror 260 can be located such that the diffracted orders from each of the gratings are spatially resolved, and the unwanted orders can be blocked. Mirror 260 passes the first orders of light output by the first arm through holes 261. Mirror 260 reflects the first orders of light output by the second arm. As such, the structured illumination pattern may be switched from a vertical orientation (e.g., grating 230A) to a horizontal orientation (e.g., grating 230B) by turning each emitter on or off or by opening and closing an optical shutter that directs a light source's light through the fiber optic cable. In other implementations, the structured illumination pattern may be switched by using an optical switch to change the arm that illuminates the sample.

Also illustrated in example imaging system 200 are a tube lens 265, a semi-reflective mirror 280, objective 270, and camera 290. For example, tube lens 265 may be implemented to articulate along the z-axis to adjust the structured beam shape and path. Semi-reflective mirror 280 may be a dichroic mirror to reflect structured illumination light received from each arm down into objective 270 for projection onto sample 271, and to pass through light emitted by sample 271 (e.g., fluorescent light, which is emitted at different wavelengths than the excitation) onto camera 290.

Output data (e.g., images) from camera 290 may be communicated to a real-time SIM imaging component (not shown) that may be implemented as a software application that, as further described below, may reconstruct the images captured during each imaging cycle to create an image having a higher spatial resolution. The reconstructed images may take into account changes in structure illumination parameters that are predicted over time. In addition, the real-time SIM imaging component may be used to track predicted SIM parameters and/or make predictions of SIM parameters given prior estimated and/or predicted SIM parameters.

A controller (not shown) can be provided to control the operation of structured illumination imaging system 200, including synchronizing the various optical components of system 200. The controller can be implemented to control aspects of system operation such as, for example, configuration of each optical arm (e.g., turning on/off each optical arm during capture of phase images, actuation of phase modulators 240A-240B), movement of tube lens 265, stage movement (if any stage is used) of sample 271, and imaging operations. The controller may be also be implemented to control hardware elements of the system 200 to correct for changes in structured illumination parameters over time. For example, the controller may be configured to transmit control signals to devices (e.g., phase modulators 240A-240B) controlling a configuration of each optical arm or some other element of system 100 to correct or compensate for changes in structured illumination phase, frequency, and/or orientation over time. As another example, when gratings 230A-230B are mounted on linear motion stages (e.g., instead of using phase modulators 240A-240B), the controller may be configured to control the linear motion stages to correct or compensate for phase changes. In implementations, these signals may be transmitted in accordance with structured illumination parameters predicted using a SIM imaging component. In some implementations, the controller may include a memory for storing predicted and or estimated structured illumination parameters corresponding to different times and/or sample positions.

It should be noted that, for the sake of simplicity, optical components of SIM imaging system 200 may have been omitted from the foregoing discussion. Additionally, although system 200 is illustrated in this example as a single channel system, in other implementations, it may be implemented as a multi-channel system (e.g., by using two different cameras and light sources that emit in two different wavelengths).

Figure 4:
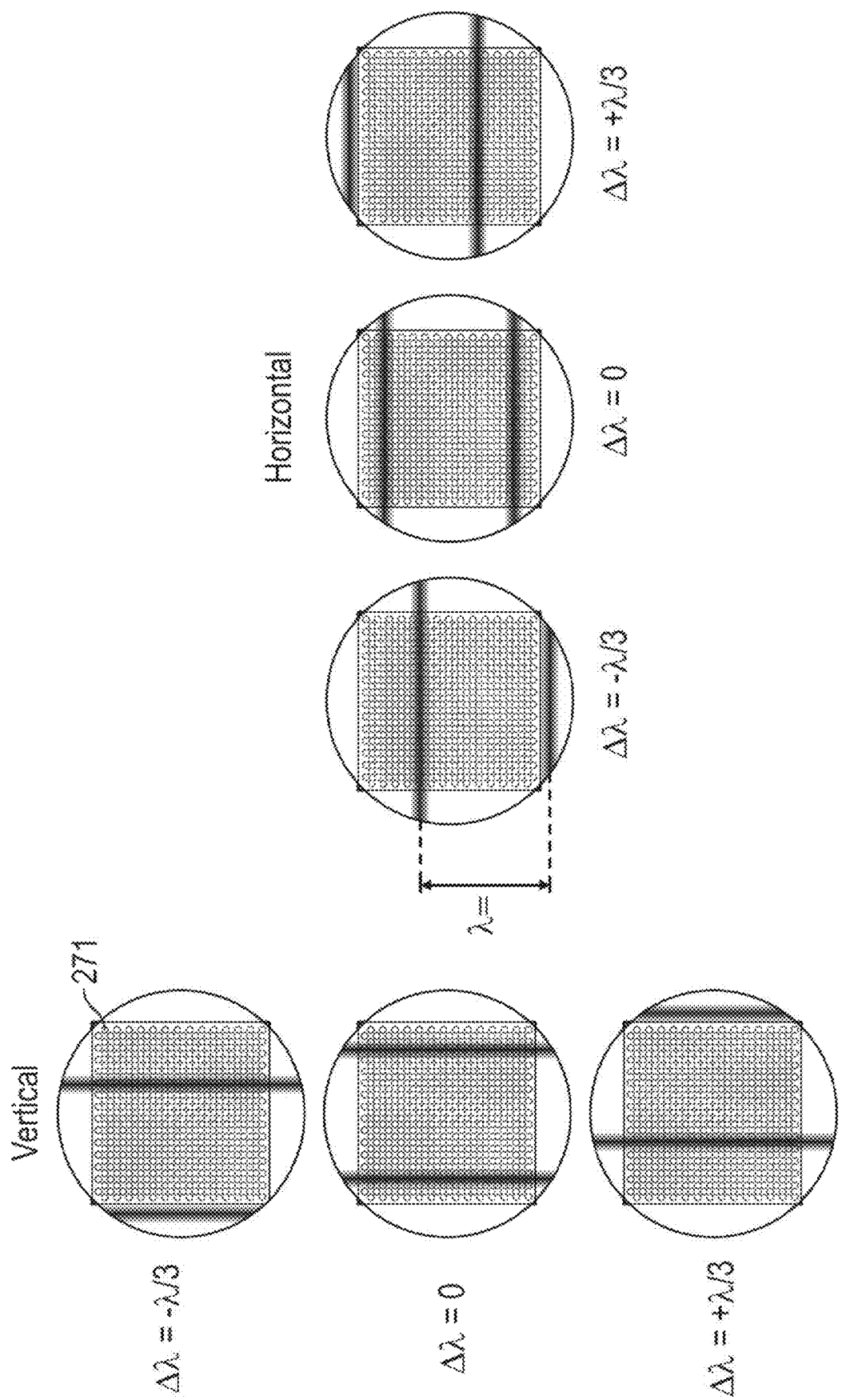
FIG. 4 illustrates, in one example, simplified illumination fringe patterns that may be projected onto the plane of a sample by a vertical grating and horizontal grating of the SIM imaging system of FIG. 3 during one imaging cycle to use structured light to create a high-resolution image.

FIG. 4 illustrates simplified illumination fringe patterns that may be projected onto the plane of a sample 271 by a vertical grating 230A and horizontal grating 230B of SIM imaging system 200 during one imaging cycle to use structured light to create a high-resolution image. In this example, three phase images with a vertical illumination orientation may be captured using vertical grating 230A, and three phase images with a horizontal illumination orientation may be captured using horizontal grating 230B. For each orientation, projected fringes may be phased shifted in position in steps of ⅓λ (e.g., by setting phase modulator 230A or 230B to three different positions) to capture three phase images of the orientation pattern.

During capture of each phase image, any light emitted by the sample may be captured by camera 290. For instance, fluorescent dyes situated at different features of the sample 271 may fluoresce and the resultant light may be collected by the objective lens 270 and directed to an image sensor of camera 290 to detect the florescence. The captured six images may be to image an entire sample or a location of a larger sample.

Once all images have been captured for the imaging cycle (in this example, six images), a high resolution image may be constructed from the captured images. For example, a high resolution image may be reconstructed from the six images shown in FIG. 4. Suitable algorithms may be used to combine these various images to synthesize a single image of the sample with significantly better spatial resolution than any of the individual component images.

During construction of the high resolution image, undesired shifts or changes in structured illumination parameters (e.g., phase, frequency, orientation), may be algorithmically compensated for using structured illumination parameters predicted in accordance with the disclosure (e.g., predicted changes in phase, frequency, or orientation). For example, offsets in the phases, orientation, and/or frequency of the vertical illumination images and/or the horizontal illumination images may be compensated for.

In some implementations, undesired shifts or changes in structured illumination parameters may be compensated for prior to image capture by controlling one or more hardware elements of system 200 to compensate for those changes in the SIM imaging system. For example, prior to an imaging sequence and/or in between capture of images of an imaging sequence, phase drift may be compensated for each optical arm by adjusting a phase shifting element (e.g., rotating mirror, linear actuator, etc.). In some implementations, a combination of hardware and algorithmic compensation may be implemented.

Although system 200 illustrates a two-arm structured illumination imaging system that includes two gratings oriented at two different angles, it should be noted that in other implementations, the technology described herein may be implemented with systems using more than two arms. In the case of a regularly patterned sample with features on a rectangular grid, resolution enhancement can be achieved with only two perpendicular angles (e.g., vertical grating and horizontal grating) as described above. On the other hand, for image resolution enhancement in all directions for other samples (e.g., hexagonally patterned samples), three grating angles may be used. For example, a three-arm system may include three light emitters and three fixed diffraction gratings (one per arm), where each diffraction grating is oriented around the optical axis of the system to project a respective pattern orientation on the sample (e.g., a 0° pattern, a 120° pattern, or a 240° pattern). In such systems, additional mirrors with holes may be used to combine the additional images of the additional gratings into the system in a lossless manner. Alternatively, such systems may utilize one or more polarizing beam splitters to combine the images of each of the gratings.

Figure 5A:
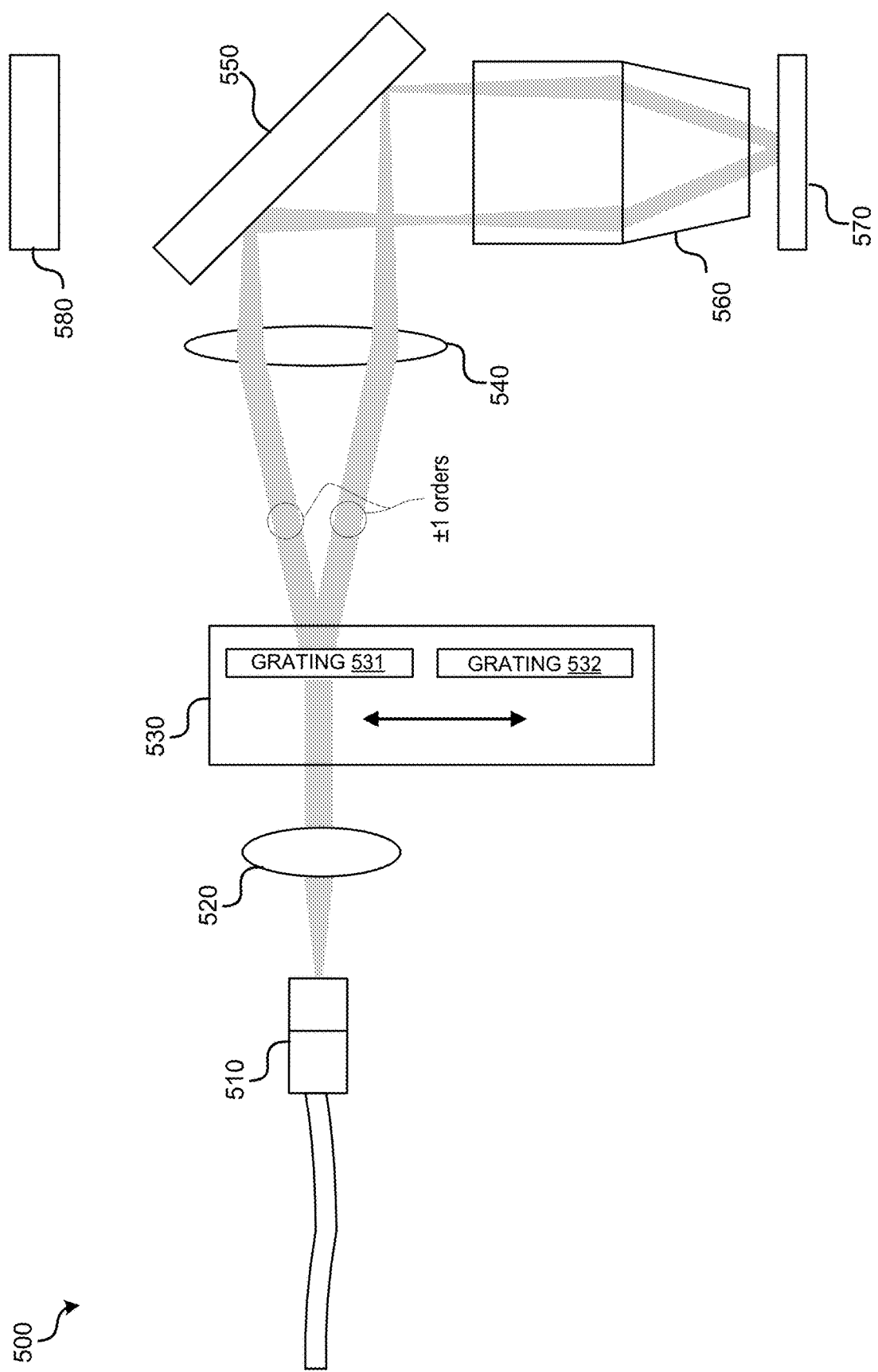
FIG. 5A is a schematic diagram illustrating an example optical configuration of a dual optical grating slide SIM imaging system that may implement structured illumination parameter prediction, in accordance with some implementations described herein.

FIGS. 5A-5B are schematic diagrams illustrating an example optical configuration of a dual optical grating slide SIM imaging system 500 that may implement structured illumination parameter prediction in accordance with some implementations described herein. In example system 500, all changes to the grating pattern projected on sample 570 (e.g., pattern phase shifts or rotations) may be made by linearly translating a motion stage 530 along a single axis of motion, to select a grating 531 or 532 (i.e., select grating orientation) or to phase shift one of gratings 531-532.

System 500 includes a light emitter 510 (e.g., optical fiber optically coupled to a light source), a first optical collimator 520 (e.g., collimation lens) to collimate light output by light emitter 510, a linear motion stage 530 mounted with a first diffraction grating 531 (e.g., horizontal grating) and a second diffraction grating 532 (e.g. vertical grating), a tube lens 540, a semi-reflective mirror 550 (e.g., dichroic mirror), an objective 560, a sample 570, and a camera 580. For simplicity, optical components of SIM imaging system 500 may be omitted from FIG. 5A. Additionally, although system 500 is illustrated in this example as a single channel system, in other implementations, it may be implemented as a multi-channel system (e.g., by using two different cameras and light sources that emit in two different wavelengths).

As illustrated by FIG. 5A, a grating 531 (e.g., a horizontal diffraction grating) may diffract a collimated light beam into first order diffracted light beams (on the plane of the page). As illustrated by FIG. 5B, a diffraction grating 532 (e.g., a vertical diffraction grating) may diffract a beam into first orders (above and below the plane of the page). In this configuration only a single optical arm having a single emitter 510 (e.g., optical fiber) and single linear motion stage is needed to image a sample 570, which may provide system advantages such as reducing the number of moving system parts to improve speed, complexity and cost. Additionally, in system 500, the absence of a polarizer may provide the previously mentioned advantage of high optical efficiency. The configuration of example SIM imaging system 200 may be particularly advantageous in the case of a regularly patterned sample 570 with features on a rectangular grid, as structured resolution enhancement can be achieved using only two perpendicular gratings (e.g., vertical grating and horizontal grating).

To improve efficiency of the system, the zeroth order beams and all other higher order diffraction beams (i.e., ±2 orders or higher) output by each grating may be blocked (i.e., filtered out of the illumination pattern projected on the sample 570). For example, a beam blocking element (not shown) such as an order filter may be inserted into the optical path after motion stage 530. In some implementations, diffraction gratings 531-532 may configured to diffract the beams into only the first orders and the zeroth order (undiffracted beam) may be blocked by some beam blocking element.

In the example of system 500, the two gratings may be arranged about ±45° from the axis of motion (or other some other angular offset from the axis of motion such as about +40°/−50°, about +30°/−60°, etc.) such that a phase shift may be realized for each grating 531-532 along a single axis of linear motion. In some implementations, the two gratings may be combined into one physical optical element. For example, one side of the physical optical element may have a grating pattern in a first orientation, and an adjacent side of the physical optical element may have a grating pattern in a second orientation orthogonal to the first orientation.

Single axis linear motion stage 530 may include one or more actuators to allow it to move along the X-axis relative to the sample plane, or along the Y-axis relative to the sample plane. During operation, linear motion stage 530 may provide sufficient travel (e.g., about 12-15 mm) and accuracy (e.g., about less than 0.5 micrometer repeatability) to cause accurate illumination patterns to be projected for efficient image reconstruction. In implementations where motion stage 530 is utilized in an automated imaging system such as a fluorescence microscope, it may be configured to provide a high speed of operation, minimal vibration generation and a long working lifetime. In implementations, linear motion stage 530 may include crossed roller bearings, a linear motor, a high-accuracy linear encoder, and/or other components. For example, motion stage 530 may be implemented as a high-precision stepper or piezo motion stage that may be translated using a controller.

Output data (e.g., images) from camera 580 may be communicated to a real-time SIM imaging component (not shown) that may be implemented as a software application that, as further described below, may reconstruct the images captured during each imaging cycle to create an image having a higher spatial resolution. The reconstructed images may take into account changes in structure illumination parameters that are predicted over time. In addition, the real-time SIM imaging component may be used to track predicted SIM parameters and/or make predictions of SIM parameters given prior estimated and/or predicted SIM parameters.

A controller (not shown) can be provided to control the operation of structured illumination imaging system 500, including synchronizing the various optical components of system 500. The controller can be implemented to control aspects of system operation such as, for example, translation of linear motion stage 530, movement of tube lens 540, stage movement (if any stage is used) of sample 570, and imaging operations. The controller may be also be implemented to control hardware elements of the system 500 to correct for changes in structured illumination parameters over time. For example, the controller may be configured to transmit control signals to devices (e.g., linear motion stage 530) to correct or compensate for changes in structured illumination phase, frequency, and/or orientation over time. In implementations, these signals may be transmitted in accordance with structured illumination parameters predicted using a SIM imaging component. In some implementations, the controller may include a memory for storing predicted and or estimated structured illumination parameters corresponding to different times and/or sample positions.

Although the example of FIGS. 5A-5B illustrates a dual optical grating slide imaging system that may implement structured illumination parameter prediction, structured illumination parameter prediction may be implemented in SIM imaging systems that use a linear motion actuator mounted with more than two diffraction gratings.

Figure 6:
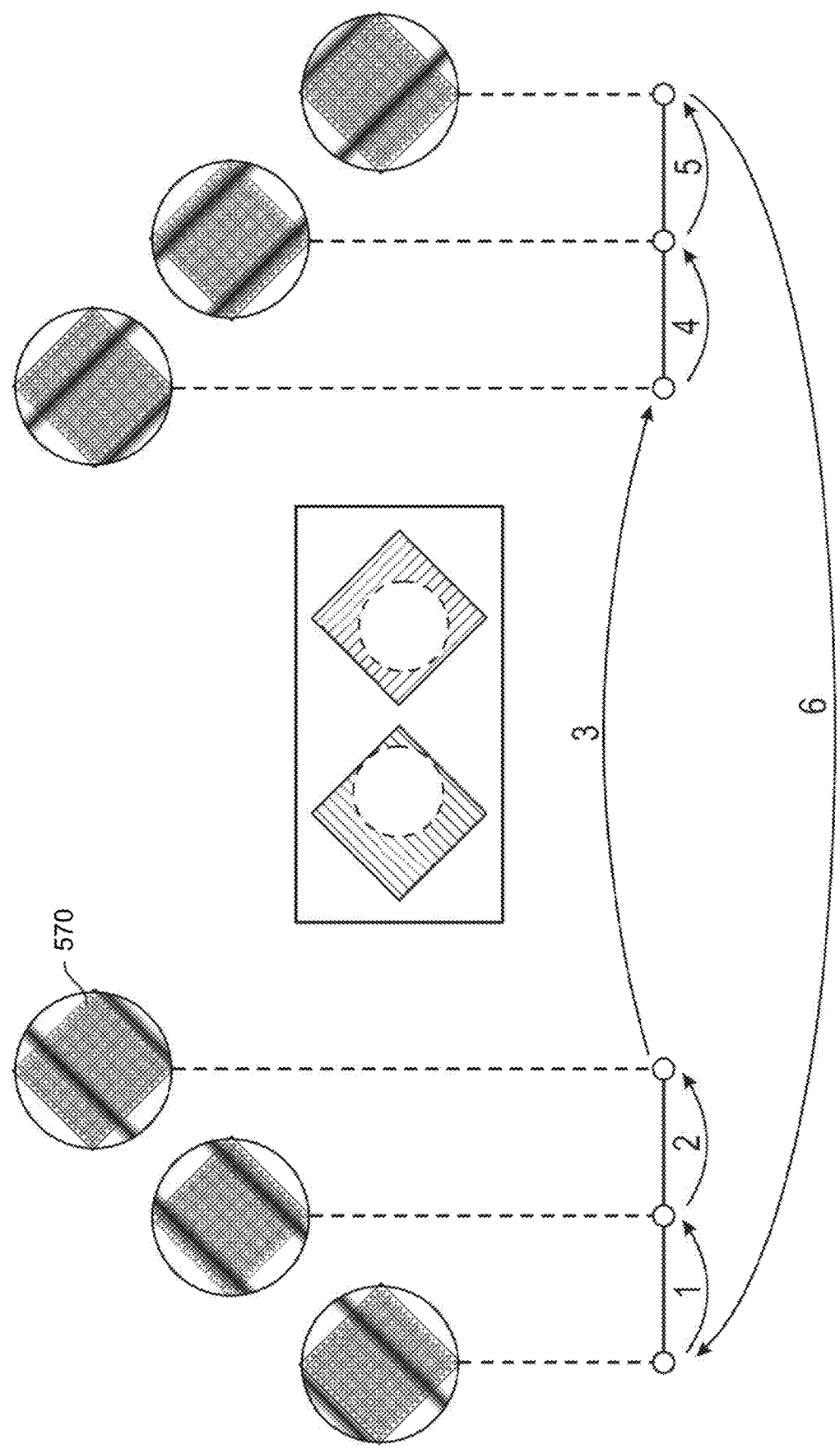
FIG. 6 illustrates, in one example, simplified illumination fringe patterns that may be projected onto the plane of a sample by a first diffraction grating and a second diffraction grating of the SIM imaging system of FIGS. 5A-5B during image capture for a structured illumination imaging cycle.

FIG. 6 illustrates simplified illumination fringe patterns that may be projected onto the plane of a sample 570 by a first diffraction grating and a second diffraction grating of a dual optical grating slide SIM imaging system 500 during image capture for a structured illumination imaging cycle. For example, a SIM imaging system 500 may use a first diffraction grating 531 and second diffraction grating 532 to generate the illumination patterns shown in FIG. 6. As illustrated in the example of FIG. 6, the two gratings project perpendicular fringe patterns on the surface of sample 570 and are arranged about ±45° from the axis of motion of linear motion stage 530.

For example, a first grating (e.g., grating 531), may project first-order illumination fringes on sample 570. Any light emitted by the sample may be captured by camera 580 and a first phase image of the first pattern (e.g., +45° pattern) may be captured to create a first phase image. To capture additional phase shifted images, the pattern projected by the grating may be phase shifted by translating the linear motion stage. These phase shift motions are illustrated as steps 1 and 2 in FIG. 6. The phase shift motions may provide small (e.g., about 3 to 5 micrometers or smaller) moves of the gratings to slightly shift the fringe pattern projected on the grating.

Following capture of all phase shifted images for a diffraction grating, system 500 may switch diffraction gratings by translating the linear motion stage 530 to optically couple another diffraction grating to the light source of the imaging system (e.g., transition from FIG. 5A to 5B). This motion is illustrated as step 3 in the example of FIG. 6. In the case of diffraction grating changes, the linear motion stage may provide a relatively large translation (e.g., on the order of 12-15 mm).

A series of phase images may then be captured for the next grating. For instance, as illustrated by FIG. 6, a second diffraction grating may project first-order illumination fringes on the sample, and the projected fringes may be shifted in position by translating the linear motion stage 530 to capture three phase images of the grating's pattern (e.g., steps 4 and 5 of FIG. 6).

Once all images have been captured for the imaging cycle (in this example, six images), a high resolution image may be constructed from the captured images. For example, a high resolution image may be reconstructed from the six images shown in FIG. 6. Suitable algorithms may be used to combine these various images to synthesize a single image of the sample with significantly better spatial resolution than any of the individual component images.

During construction of the high resolution image, undesired shifts or changes in structured illumination parameters (e.g., phase, frequency, orientation), may be algorithmically compensated for using structured illumination parameters predicted in accordance with the disclosure (e.g., predicted changes in phase, frequency, or orientation). For example, offsets in the phases, orientation, and/or frequency of the vertical illumination images and/or the horizontal illumination images may be compensated for.

In some implementations, undesired shifts or changes in structured illumination parameters may be compensated for prior to image capture by controlling one or more hardware elements of system 500 to compensate for those changes in the SIM imaging system. For example, prior to an imaging sequence and/or in between capture of images of an imaging sequence, phase drift may be compensated for by translating linear motion stage 530. In some implementations, a combination of hardware and algorithmic compensation may be implemented.

In accordance with implementations described herein, structured illumination parameters may be predicted for a particular point in time using estimates of structured illumination parameters obtained from images captured before and/or after that point in time. For example, computational resource limitations may limit the rate at which a SIM imaging system (e.g., system 100, 200, or 500) may directly estimate structured illumination parameters such as phase, frequency, and/or orientation from captured images. In some cases, a SIM imaging system may directly estimate or measure a structured illumination parameter every phase image, in which case it may not be necessary to predict structured illumination parameters. However, in other cases, a SIM imaging system may only be able to directly estimate or measure a structured illumination parameter for some phase images of an imaging cycle, once per imaging cycle, or even less frequently (e.g., every 3, 5, 10, 50, or 100 imaging cycles). In such cases, to keep up with the image sampling rate of the system, it may be advantageous to leverage a direct estimate of the structured illumination parameter that was obtained for a particular point in time and/or space to make predictions about the structured illumination parameter at other points in time and/or space.

To mathematically illustrate one example of this principal, correlation against a reference is one way to estimate structured illumination parameters.

$$\text{Correlation Output} = \Sigma_x c(x) h(x-f), \quad (1)$$

where $h(x)$ is a reference which may either be known or derived from image data, $c(x)$ is derived from image data which is correlated to the reference, and $f$ is a value to be estimated (in this example, frequency). It should be noted that other alternative estimation techniques may be utilized in accordance with the disclosure.

In the example of Equation (1), one correlation output may be generated for each of a number of hypothetical values of $f$. The parameter estimate $f$ may be obtained as the value of $f$ which maximizes the magnitude of the correlation. However, in many cases, a large number of hypothetical values of $f$ may need to be attempted in order to maximize the correlation output. The large search space may increase the computational requirements, and as a result, may cause reduced system throughput (i.e., less data processed per unit of time).

Figure 7:
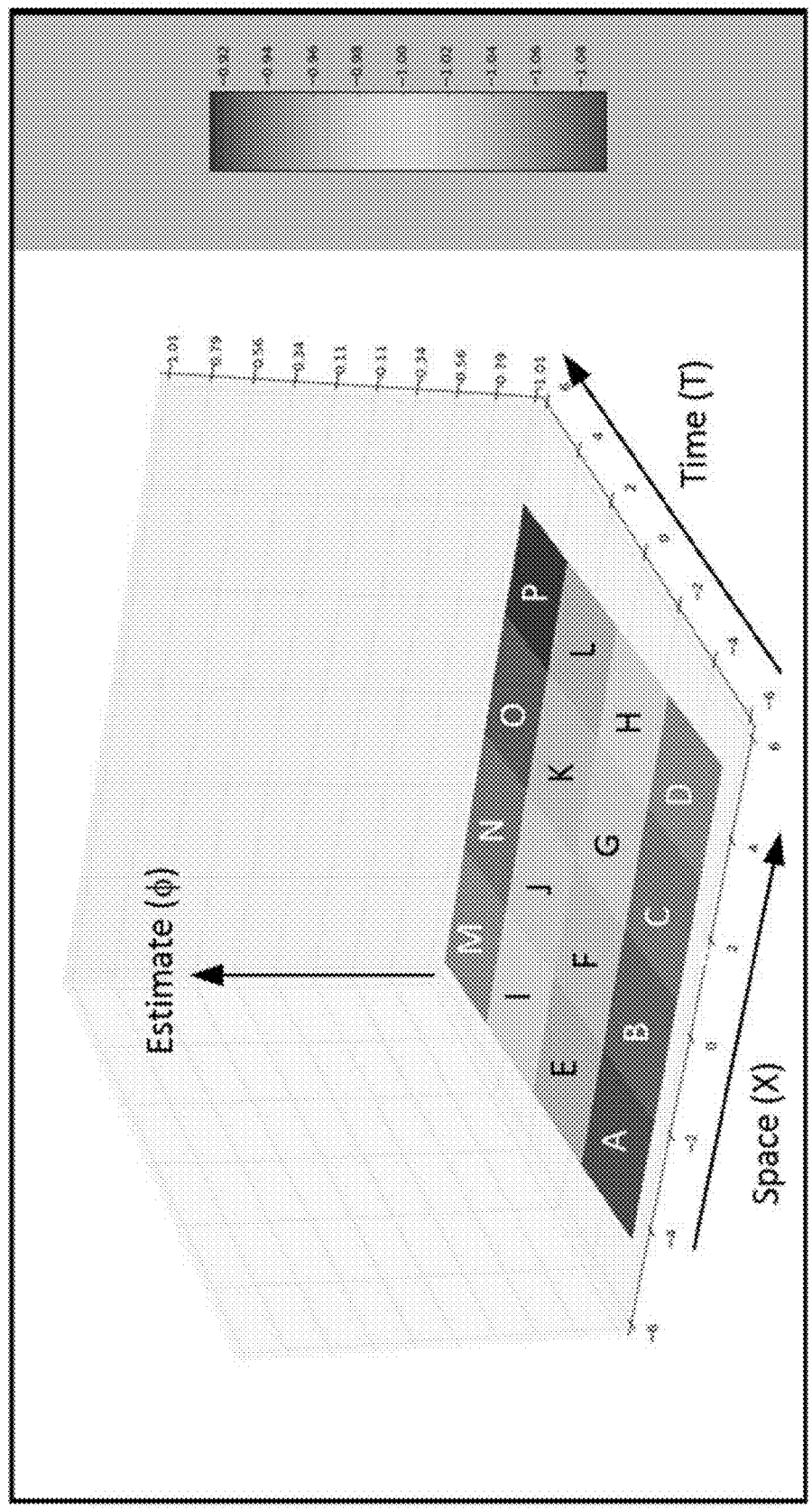
FIG. 7 shows, in one example, an estimate of a phase parameter that varies in space (X) and time (T).

To circumvent this problem, information from a prior $f$ estimate may be used to ascertain a "neighborhood" of a new $f$ value to be determined. As an example, consider FIG. 7, which shows an estimate ($\phi$) which varies in space (X) and time (T). As illustrated by FIG. 7, an initial value for $\phi$ may be obtained for the X and T coordinates corresponding to the A block. Assuming that the value of the estimate varies slowly in space or time, the estimate from the A block ($\phi_A$) may be used as an initial value for either the B or E blocks. More specifically, the search space for the B and E blocks may be restricted to values in the "neighborhood" of the value of $\phi$ obtained from the A block. With this approach, the time required to identify $\phi$ may be reduced considerably, and as a result, the amount of data processed in a unit of time may be increased accordingly.

Figure 8:
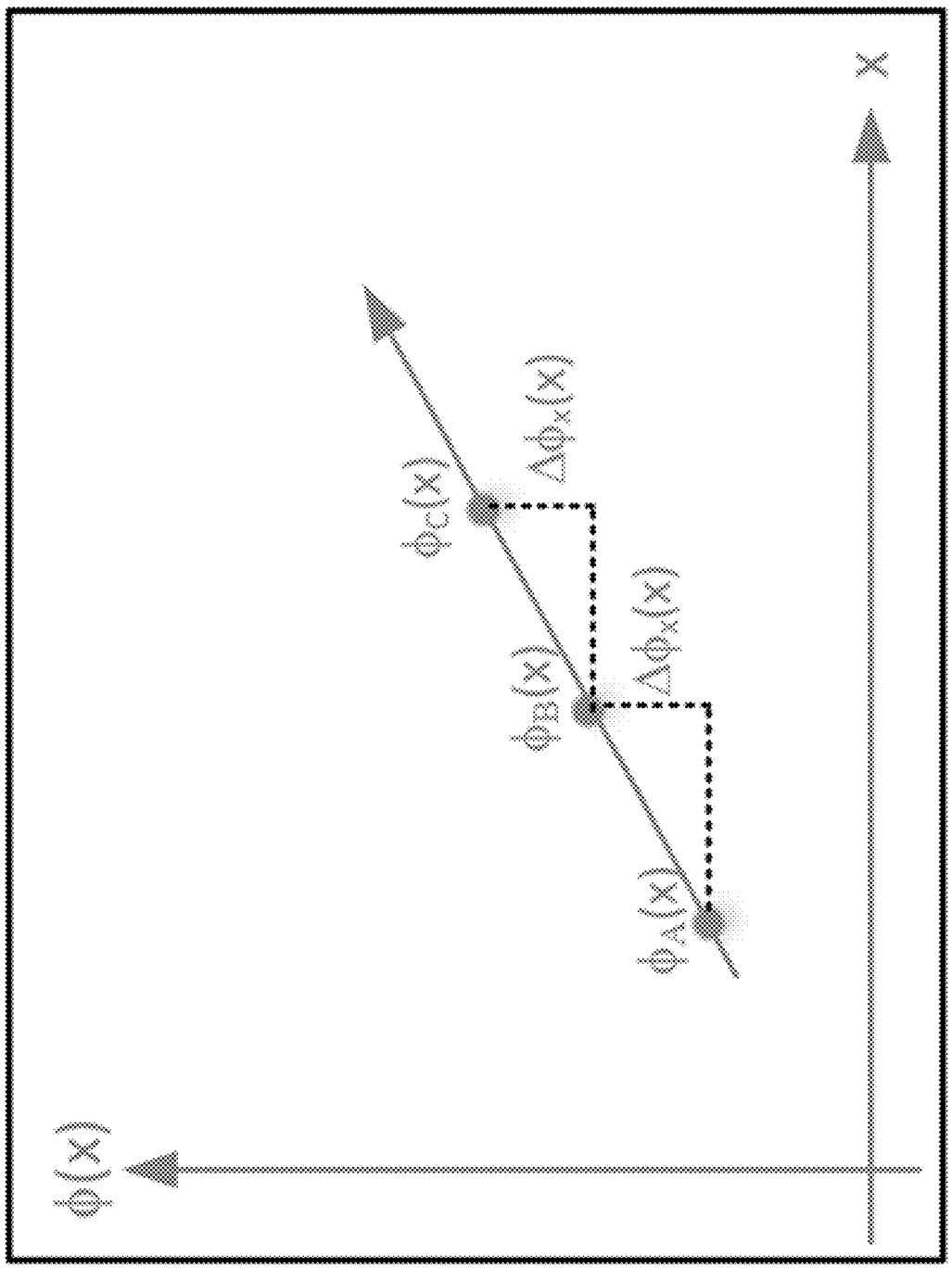
FIG. 8 illustrates, in one example, a trend of the estimate variation of a parameter as a function of x.

To extend this concept, a trend of the estimate variation may be predicted in either the space (X) or time (T) dimension. As an example, consider FIG. 7, where the per block estimate increases by $\Delta\phi_X$ in the spatial dimension, and by $\Delta\phi_T$ in the time dimension. Given this observation, an initial estimate for Block B could be derived as $\phi_A+\Delta\phi_X$, as illustrated by FIG. 8. Further, an initial estimate of Block E could be derived as $\phi_A+\Delta\phi_T$. Other predictors in both the X and T dimensions using values from multiple blocks could also be implemented.

Figure 9:
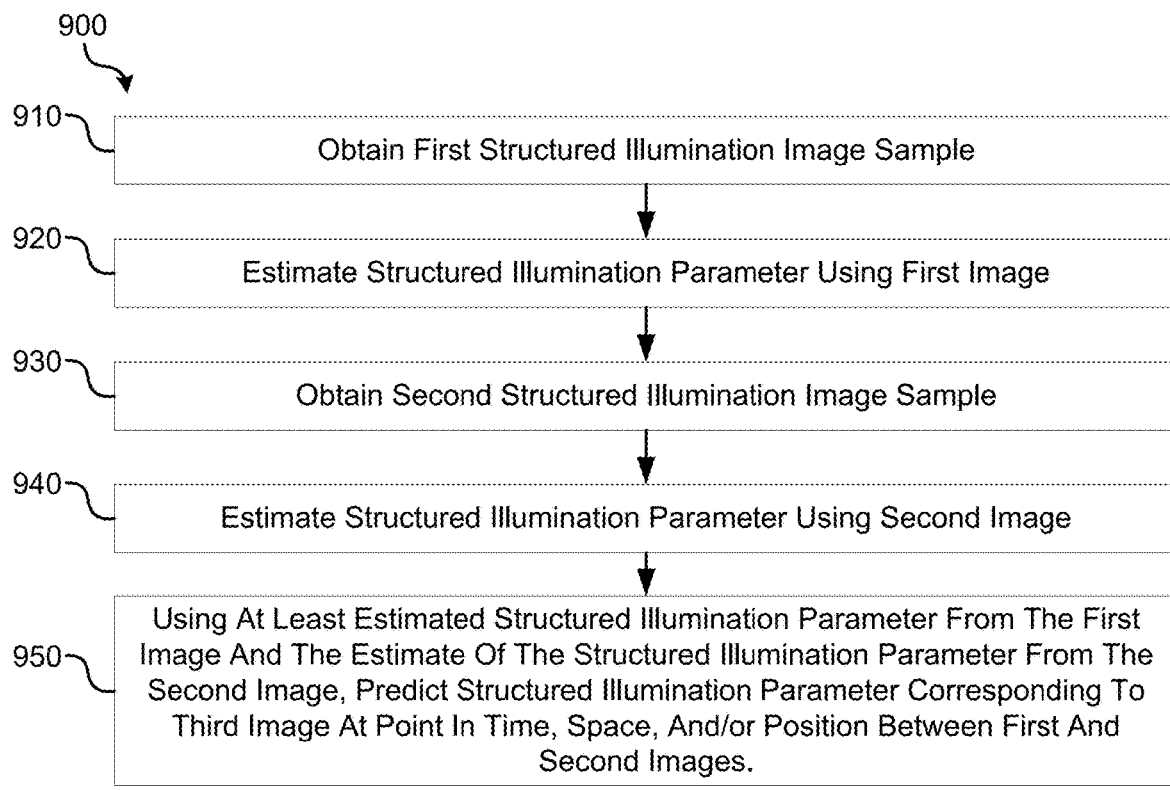
FIG. 9 is an operational flow diagram illustrating an example interpolation method for predicting structured illumination parameters for a particular point in time using estimates of structured illumination parameters obtained from images captured before and after the point time, in accordance with some implementations described herein.

FIG. 9 is an operational flow diagram illustrating an example interpolation method 900 for predicting structured illumination using estimates of structured illumination parameters obtained from multiple images captured by a structured illumination system. In implementations, method 700 may be implemented by executing machine readable instructions stored in a memory of a SIM imaging system (e.g., system 100, 200, or 500).

At operation 910, a first SIM image sample may be obtained. For example, a phase image of a sample may be captured at a first point in time. At operation 920, a structured illumination parameter may be estimated using the captured first image. For example, any one of a structured illumination phase, frequency, orientation, or modulation order may be estimated. The estimate may be obtained at particular point in time, space, and/or temperature.

At operation 930 a second SIM image sample may be obtained. For example, a phase image of the sample may be captured at a second point in time after a first point in time when the first SIM image sample is captured. In some implementations, the first image of the sample and the second image of the sample may be captured during the same imaging sequence (e.g., as part of an imaging sequence that generates six phase images or nine phase images that are constructed into a higher resolution image). In other implementations, the first image and the second image may be captured during different imaging sequences. At operation 940, a structured illumination parameter may be estimated using the captured second image. For example, any one of a structured illumination phase, frequency, orientation, or modulation order may be estimated. The estimate may be obtained at particular point in time, space, and/or temperature.

At operation 950, using at least the estimate of the structured illumination parameter from the first image and the estimate of the structured illumination from the second image, a structured illumination parameter corresponding to a third image may be predicted, where the third image is at a point in time, space (e.g., sample position), and/or temperature (e.g., sample temperature) between the first image and the second image. For example, the third image may have been captured after the first image but before the second image. As another example, the third image may be captured at a later time at a position between the first image and the second image.

In some implementations, this prediction may be based on at least a determined rate of change of the structured illumination parameter between two points in time. By way of mathematical illustration, for a first time T1, and a second time T2, if it is determined that a structured illumination phase has drifted by an amount $\Delta\phi_T$, then the rate of change (e.g., drift) of the phase may be expressed as $\Delta\phi_T/(T2-T1)$. Using interpolation, the amount of phase drift for a time T3 may be predicted. For example, if the phase drifted from a 5 degree offset at time T1 to a 15 degree offset at time T2, then it may be predicted that the phase had drifted to a 10 degree offset at a time T3 halfway between these two times.

Although method 900 is primarily described in the context of applying interpolation to predict a structured illumination parameter at a particular point in time, space, and/or temperature given two known estimates of the structured illumination parameter, it should be noted that method 900 may be extended to the case where there are more than two known estimates. In such cases, an appropriate trend estimation function may be used to predict the structured illumination parameter. For example, in the case of linear trend estimation, a least-squares fit may be applied to the known estimates to interpolate and predict the structured illumination parameter at a particular point in time, space, and/or temperature. In some implementations, a prediction of a structured illumination parameter may be updated over time as additional estimates are gathered. Additionally, although method 900 is described as using estimates from the first image and the second image to predict a parameter corresponding to a third image, in some implementations, only one of the two estimates may be used (e.g., by holding the estimate) to predict the parameter.

Additionally, although method 900 is described in the context of applying interpolation to predict a structured illumination parameter at a particular time given two known estimates of the structured illumination parameter at different times, method 900 may also be extended to consider dimensions of space (e.g., a location or subset of an imaged sample) and temperature. In some instances, a joint prediction that considers multiple parameters (e.g., space, time, and/or temperature) may be applied. For example, as illustrated by FIG. 7, a trend in both time and space may be considered in predicting structured illumination parameters. Alternatively, a trend in the structured illumination parameter in just space may be considered.

Figure 10:
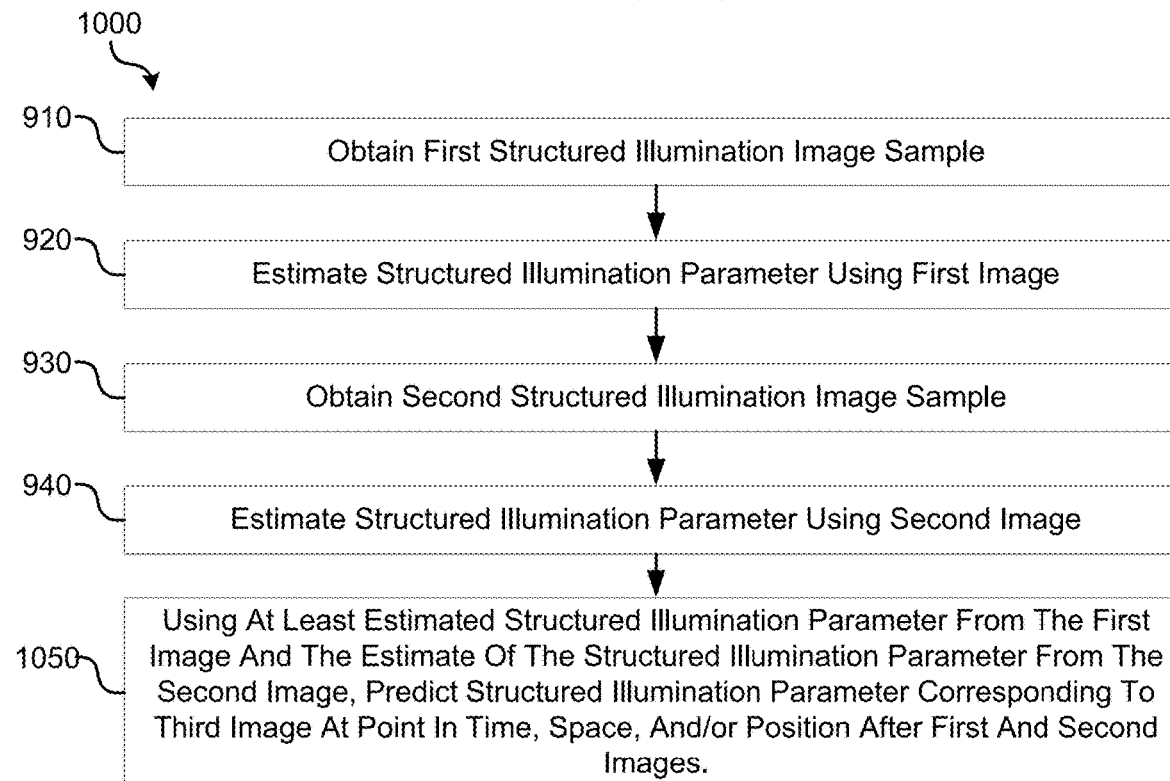
FIG. 10 is an operational flow diagram illustrating an example extrapolation method for predicting structured illumination parameters for a particular point in time using estimates of structured illumination parameters obtained from two or more images captured before the point in time, in accordance with some implementations described herein.

FIG. 10 is an operational flow diagram illustrating an example extrapolation method 1000 for predicting structured illumination parameters using estimates of structured illumination parameters obtained from two or more images. In implementations, method 700 may be implemented by executing machine readable instructions stored in a memory of a SIM imaging system (e.g., system 100, 200, or 500).

Operations 910-940 of method 1000 may be performed as discussed above with reference to method 900. For example, a structured illumination frequency may be estimated at a first point in time and second point in time using captured images.

At operation 1050, using at least the estimate of the structured illumination parameter from the first image and the estimate of the structured illumination from the second image, a structured illumination parameter corresponding to a third image may be predicted, where the third image is at a point in time, space (e.g., sample position), and/or temperature (e.g., sample temperature) after both the first image and the second image, or before both the first image and the second image. In some implementations, this prediction may be based on at least a determined rate of change of the structured illumination parameter between the two points in time. By way of mathematical illustration, for a first time T1, and a second time T2, if it is determined that a structured illumination frequency has drifted by an amount $\Delta f$, then the rate of change (e.g., drift) of the phase may be expressed as $\Delta f/(T2-T1)$. Using extrapolation, the total amount of frequency drift at a later time T3 may be predicted.

Although method 1000 is described in the context of applying extrapolation to predict a structured illumination parameter at a particular point in time, space, and/or temperature given two known estimates of the structured illumination parameter, it should be noted that as in the case of method 900, method 1000 may be extended to the case where there are more than two known estimates. In such cases, an appropriate trend estimation function may be used to predict the structured illumination parameter. For example, in the case of linear trend estimation, a least-squares fit may be applied to the known estimates to extrapolate and predict the structured illumination parameter. In some implementations, a prediction of a structured illumination parameter may be updated over time as additional estimates are gathered.

Additionally, although method 1000 is described as using estimates from the first image and the second image to predict a parameter corresponding to a third image, in some implementations, only one of the two estimates may be used (e.g., by holding the estimate) to predict the parameter.

Additionally, although method 1000 is described in the context of applying extrapolation to predict a structured illumination parameter at a particular time given two known estimates of the structured illumination parameter at different times, as in the case of method 900, method 1000 may also be extended to consider other dimensions such as space and temperature.

In implementations of methods 900 and 1000, the structured illumination parameter estimated using the first image, the structured illumination parameter estimated using the second image, and/or the structured illumination parameter predicted for the third image may be stored in a memory of the SIM imaging system. For instance, the estimated/predicted parameters may be stored in a history file such as a lookup table to be referenced during high resolution image construction, during adjustments of SIM imaging system hardware components to compensate for structured illumination parameter changes, and/or to facilitate prediction of other structured illumination parameters at other points in time, space, and/or temperature. In implementations, the time, sample location, and sample temperature corresponding to each estimation or prediction may be stored.

In implementations of methods 900 and 1000, the first and second estimates used to predict the structured illumination parameter may be generated using a plurality of images. As such, one or more images from a first set of images (e.g., 1, 2, 3, 4, 5, 6, etc.) in an imaging sequence may be used to generate a first estimate, and one or more images from a second set of images (e.g., 1, 2, 3, 4, 5) in an imaging sequence may be used to generate a second estimate.

Figure 11:
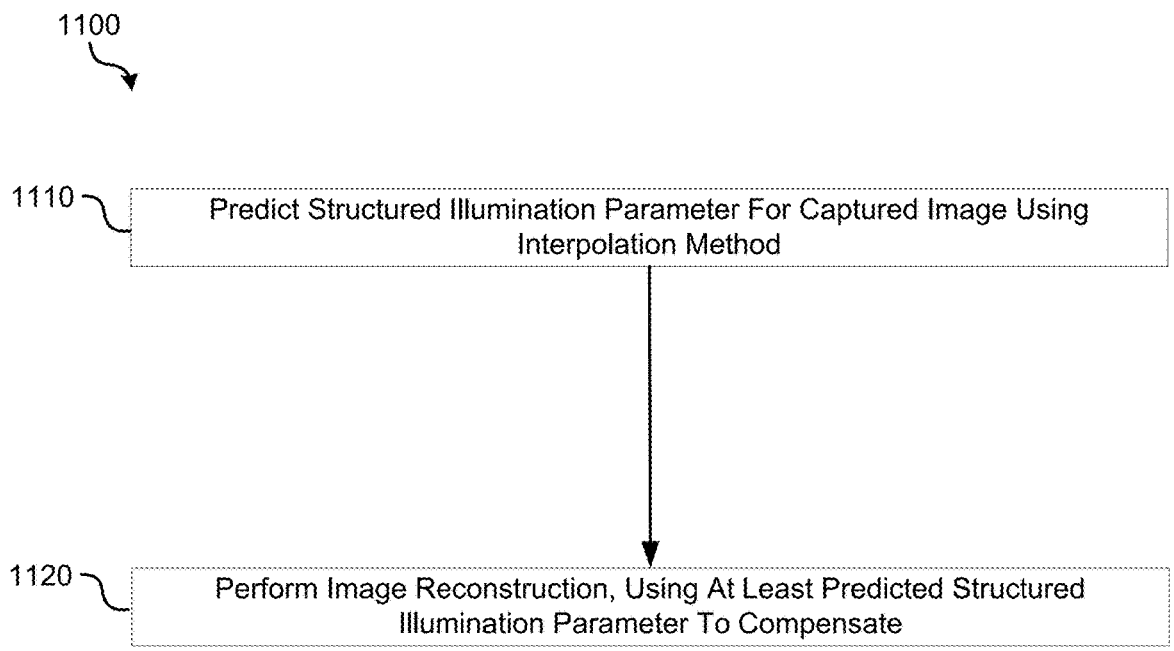
FIG. 11 is an operational flow diagram illustrating an example method of using a predicted structured illumination parameter during high resolution image reconstruction to compensate for undesired changes in structured illumination parameters over time, in accordance with some implementations described herein.

FIG. 11 is an operational flow diagram illustrating an example method 1100 of using a predicted structured illumination parameter during high resolution image reconstruction to compensate for undesired changes in structured illumination parameters over time. In implementations, method 1100 may be implemented by executing machine readable instructions stored in a memory of a SIM imaging system (e.g., system 100, 200, or 500).

At operation 1110, a structured illumination parameter may be predicted for a captured image (e.g., a phase image) using an interpolation method. For example, a structured illumination parameter may be predicted at a point in time corresponding to the captured image by implementing method 900. At operation 1120, a high resolution image construction may be performed using the captured image (e.g., phase image) and other captured images (e.g., other captured phase images). During high resolution image reconstruction, the predicted structured illumination parameter may be used to compensate for changes in the structured illumination parameter over a dimension of time, space, and/or temperature. For example, changes in frequency, phase, and/or orientation may be compensated for. In some cases, operation 1120 may comprise using multiple predicted structured illumination parameters. For example, structured illumination parameters may be predicted for more than one phase image. Additionally, two or more of phase, frequency, and orientation may be predicted for a given phase image.

Figure 12:
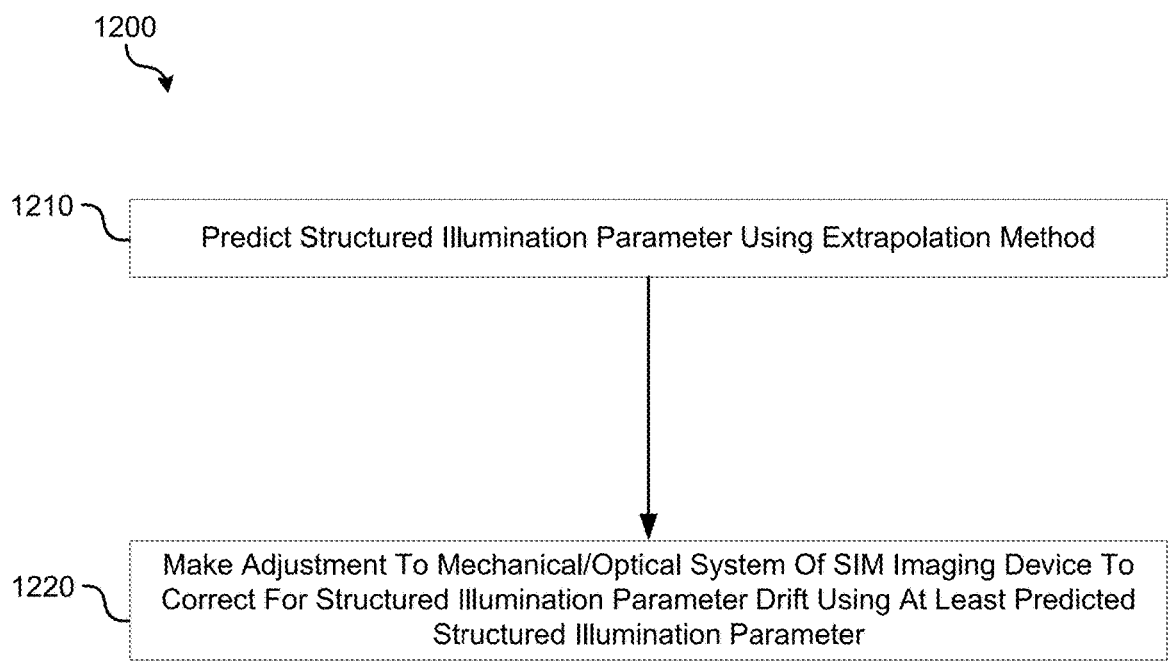
FIG. 12 is an operational flow diagram illustrating an example method of using a predicted structured illumination parameter adjustments of SIM imaging system hardware components to compensate for structured illumination parameter changes over time, in accordance with some implementations described herein.

FIG. 12 is an operational flow diagram illustrating an example method 1200 of using a predicted structured illumination parameter adjustments of SIM imaging system hardware components to compensate for structured illumination parameter changes over time. At operation 1210, a structured illumination parameter may be predicted using an extrapolation method. For example, a structured illumination parameter may be predicted at a future point in time by implementing method 1000.

At operation 1220, a mechanical and/or optical component of the SIM imaging device may be adjusted using at least the predicted structured illumination parameter. For instance, based on a predicted phase drift at a point in time T, a hardware component of the SIM imaging system may be adjusted prior to phase image capture at time T.

For example, one or more components of light structuring optical assembly 155 may be adjusted to compensate for phase and/or orientation changes that are predicted for an upcoming time for SIM imaging system 100. As another example, a rotating mirror 240A or 240B may be adjusted to compensate for phase changes that are predicted for an upcoming time for SIM imaging system 200. As a further example, a linear translation stage 530 be translated to compensate for phase changes that are predicted for an upcoming for SIM imaging system 500. As a further example, orientation changes that are predicted for a SIM imaging system may be compensated by adjusting one or more of a translation stage carrying a sample and an optical path from a light source to the sample.

In some implementations, the techniques described herein for structured illumination parameter prediction may be applied to a single captured image sample by dividing the captured image sample into a plurality of image subsections. For example, in some implementations, a method may include: obtaining an image sample; dividing the image sample into a plurality of image subsections (e.g., three or more subsections); estimating a first structured illumination parameter using a first image subsection of the plurality of image subsections; estimating a second structured illumination parameter using a second image subsection of the plurality of image subsections; and using at least the estimate of the structured illumination parameter from the first image subsection and the estimate of the structured illumination parameter from the second image subsection, predicting a structured illumination parameter corresponding to a third image subsection of the plurality of image subsections. The structured illumination parameter that is predicted for the third image subsection may be any one of a structured illumination phase, frequency, orientation, or modulation order. In some implementations, structured illumination parameters obtained from more than two image subsections may be used to predict a structured illumination parameter for another image subsection. For example, a trend estimation function or other appropriate fitting function may be applied to the known estimates from the other image subsections to predict the structured illumination parameter for another image subsection. In other implementations, an estimate of the structured illumination parameter obtained from a first image subsection may be used as the predicted structured illumination parameter for a second image subsection.

Applying the interpolation techniques described herein, the third image subsection may lie at a point in space (e.g., sample position) or temperature (e.g., sample temperature) between the first image subsection and the second image subsection. For example, the third image subsection may lie between the first image subsection and the second image subsection along a cartesian axis. In two-dimensional cartesian space, subsections may be defined by a grid that divides an image into rectangles having equal area, though alternative definitions of a subsection are possible. As another example, the third image subsection may be at a sample temperature that is greater than a sample temperature of the first image subsection but lower than a sample temperature of the second image subsection.

Applying the extrapolation techniques described herein, the third image subsection may lie at a point in space (e.g., sample position) or temperature (e.g., sample temperature) that is after or before the first image subsection and the second image subsection. For example, the third image subsection may lie after both the first image subsection and the second image subsection along a cartesian axis. As another example, the third image subsection may be at a sample temperature lower than a sample temperature of the first image subsection and lower than a sample temperature of the second image subsection.

In implementations, these techniques for using subsections of an image to predict structured illumination parameter for other subsection(s) of the image may be used in combination with the techniques described herein for using structured illumination parameters estimated from one or more images to predict structured illumination parameters for another image.

As used herein, the term component might describe a given unit of functionality that can be performed in accordance with one or more implementations of the present application. As used herein, a component might be implemented utilizing any form of hardware, software, or a combination thereof. For example, one or more processors, controllers, FPGAs, CPUs, GPUs, ASICs, PLAs, PALs, CPLDs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Figure 13:
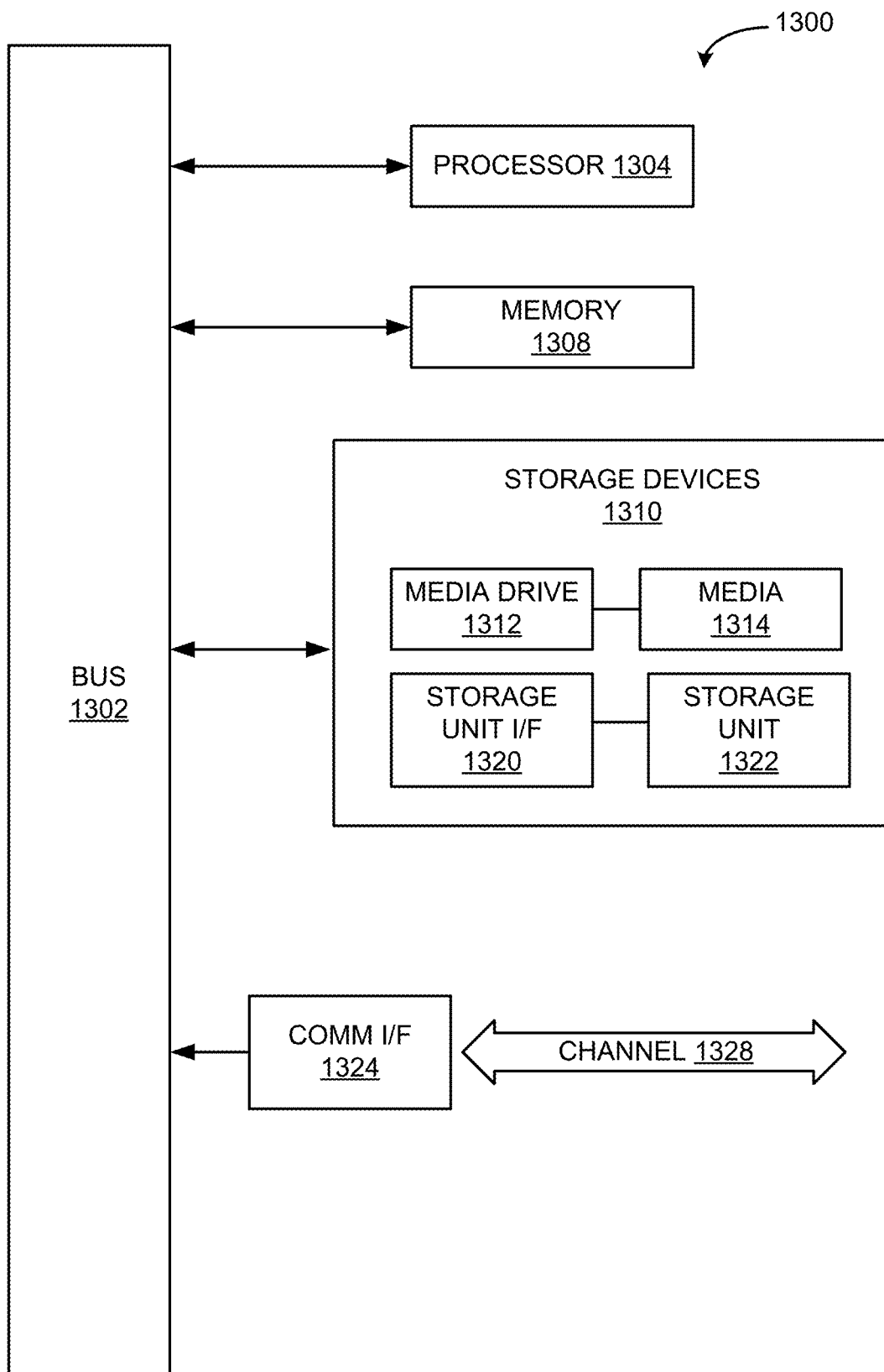
FIG. 13 is an example of a computing component that can be used in conjunction with various implementations of the present disclosure.

FIG. 13 illustrates an example computing component 1300 that may be used to implement various features of the methods disclosed herein. Computing component 1300 may represent, for example, computing or processing capabilities found within imaging devices; desktops and laptops; handheld computing devices (tablets, smartphones, etc.); mainframes, supercomputers, workstations or servers; or any other type of special-purpose or general-purpose computing devices as may be desirable or appropriate for a given application or environment. Computing component 1300 might also represent computing capabilities embedded within or otherwise available to a given device. As used herein, the term "computing device" may refer to hardware of a computing component.

Computing component 1300 might include, for example, one or more processors, controllers, control components, or other processing devices, such as a processor 1304. Processor 1304 might be implemented using a general-purpose or special-purpose processing engine such as, for example, a microprocessor, controller, or other control logic. Processor 1304 may be a type of computing device. In the illustrated example, processor 1304 is connected to a bus 1302, although any communication medium can be used to facilitate interaction with other components of computing component 1300 or to communicate externally.

Computing component 1300 might also include one or more memory components, simply referred to herein as main memory 1308. For example, preferably random access memory (RAM) or other dynamic memory, might be used for storing information and instructions to be executed by processor 1304. Main memory 1308 might also be used for storing temporary variables or other intermediate information during execution of instructions to be executed by processor 1304. Computing component 1300 might likewise include a read only memory ("ROM") or other static storage device coupled to bus 1302 for storing static information and instructions for processor 1304.

The computing component 1300 might also include one or more various forms of information storage mechanism 1310, which might include, for example, a media drive 1312 and a storage unit interface 1320. The media drive 1312 might include a drive or other mechanism to support fixed or removable storage media 1314. For example, a hard disk drive, a solid state drive, an optical disk drive, a CD, DVD, or BLU-RAY drive (R or RW), or other removable or fixed media drive might be provided. Accordingly, storage media 1314 might include, for example, a hard disk, a solid state drive, cartridge, optical disk, a CD, a DVD, a BLU-RAY, or other fixed or removable medium that is read by, written to or accessed by media drive 1312. As these examples illustrate, the storage media 1314 can include a computer usable storage medium having stored therein computer software or data.

In alternative embodiments, information storage mechanism 1310 might include other similar instrumentalities for allowing computer programs or other instructions or data to be loaded into computing component 1300. Such instrumentalities might include, for example, a fixed or removable storage unit 1322 and an interface 1320. Examples of such storage units 1322 and interfaces 1320 can include a program cartridge and cartridge interface, a removable memory (for example, a flash memory or other removable memory component) and memory slot, a PCMCIA slot and card, and other fixed or removable storage units 1322 and interfaces 1320 that allow software and data to be transferred from the storage unit 1322 to computing component 1300.

Computing component 1300 might also include a communications interface 1324. Communications interface 1324 might be used to allow software and data to be transferred between computing component 1300 and external devices. Examples of communications interface 1324 might include a peripheral interface such as the Peripheral Component Interconnect Express (PCIe) interface, a modem or softmodem, a network interface (such as an Ethernet, network interface card, WiMedia, IEEE 802.XX or other interface), a BLUETOOTH interface, a communications port (such as for example, a USB port, USB-C port, THUNDERBOLT port, or other port), or other communications interface. Software and data transferred via communications interface 1324 might typically be carried on signals, which can be electronic, electromagnetic (which includes optical) or other signals capable of being exchanged by a given communications interface 1324. These signals might be provided to communications interface 1324 via a channel 1328. This channel 1328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory mediums, volatile or non-volatile, such as, for example, memory 1308, storage unit 1322, and media 1314. These and other various forms of computer program media or computer usable media may be involved in carrying one or more sequences of one or more instructions to a processor for execution. Such instructions embodied on the medium, are generally referred to as "computer program code" or a "computer program product" (which may be grouped in the form of computer programs or other groupings). When executed, such instructions might enable the computing component 1300 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

To the extent applicable, the terms "first," "second," "third," etc. herein are merely employed to show the respective objects described by these terms as separate entities and are not meant to connote a sense of chronological order, unless stated explicitly otherwise herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

It should be appreciated that all combinations of the foregoing concepts (provided such concepts are not mutually inconsistent) are contemplated as being part of the inventive subject matter disclosed herein. In particular, all combinations of claimed subject matter appearing in this disclosure are contemplated as being part of the inventive subject matter disclosed herein.

What is claimed is:

1. A method, comprising:
capturing, at a structured illumination system, a first image of a sample at a first time, a first sample position, or a first sample temperature;
estimating, at a computing device, using at least the captured first image, a first structured illumination parameter at the first time, the first sample position, or the first sample temperature;
capturing, at the structured illumination system, a second image of the sample at a second time, a second sample position, or a second sample temperature;
estimating, at the computing device, using at least the captured second image, a second structured illumination parameter at the second time, the second sample position, or the second sample temperature; and
predicting, at the computing device, using at least the first structured illumination parameter or the second structured illumination parameter, a third structured illumination parameter at a third time, a third sample position, or a third sample temperature, the third structured illumination parameter corresponding to a third image captured at the third time, the third sample position, or the third sample temperature, wherein each of the first, second, and third structured illumination parameters comprises a phase, frequency, orientation, or modulation order.

2. The method of claim 1, wherein the first image is captured at the first time, wherein the second image is captured at the second time, wherein the second time is after the first time, wherein the third image is captured at the third time, wherein the third time is between the first time and the second time, and wherein predicting the third structured illumination parameter comprises: predicting, using at least an interpolation method, the third structured illumination parameter at the third time.

3. The method of claim 2, wherein the interpolation method comprises:
determining, at the computing device, a rate of change from the first structured illumination parameter at the first time to the second structured illumination at the second time; and
predicting, at the computing device, using at least the determined rate of change, the third structured illumination parameter at the third time.

4. The method of claim 1, further comprising: constructing, at the computing device, using at least the third image and the third structured illumination parameter, a high resolution image.

5. The method of claim 1, wherein the first image is captured at the first time, wherein the second image is captured at the second time, wherein the second time is after the first time, wherein the third image is captured at a third time, wherein the third time is after or before both the first time and the second time, wherein predicting the third structured illumination parameter comprises: predicting, using at least an extrapolation method, the third structured illumination parameter at the third time.

6. The method of claim 5, further comprising: adjusting, using at least the third structured illumination parameter, a hardware component of the structured illumination system to compensate for changes in a structured illumination parameter prior to capturing the third image at the third time.

7. The method of claim 6, wherein adjusting the hardware component comprises: adjusting one or more of: a rotating mirror to adjust a phase or orientation of a structured illumination pattern, a translation stage carrying a diffraction grating to adjust a phase or orientation of a structured illumination pattern, and a sample translation stage to adjust a phase or orientation of a structured illumination pattern.

8. The method of claim 1, further comprising:
storing in a memory of the structured illumination system: the first structured illumination parameter, the second structured illumination parameter, and the third structured illumination parameter; and
reducing, using one or more of the stored first structured illumination, stored second structured illumination parameter, stored third structured illumination parameter, and a stored value based on the known physical characteristics of the structured illumination system, a search space for a fourth structured illumination parameter for a fourth image.

9. The method of claim 1, wherein predicting the third structured illumination parameter corresponding to the third image comprises: applying a least-squares fit to at least the first structured illumination parameter and the second structured illumination parameter.

10. The method of claim 1, wherein:
the first image of the sample is captured at the first sample temperature;
the first structured illumination parameter is estimated at the first sample temperature;
the second image of the sample is captured at the second sample temperature;
the second structured illumination parameter is estimated at the second sample temperature; and
the third structured illumination parameter is predicted at the third sample temperature.

11. The method of claim 1, further comprising:
dividing the first image of the sample into a plurality of image subsections;
estimating, at the computing device, using at least a first image subsection of the plurality of image subsections, a fourth structured illumination parameter;
estimating, at the computing device, using at least a second image subsection of the plurality of image subsections, a fifth structured illumination parameter;
predicting, at the computing device, using at least the fourth structured illumination parameter or the fifth structured illumination parameter, a sixth structured illumination parameter corresponding to a third image subsection of the plurality of image subsections.

12. The method of claim 1, further comprising:
dividing the first image of the sample into a plurality of image subsections;
estimating, at the computing device, using at least a first image subsection of the plurality of image subsections, a fourth structured illumination parameter;
using the estimated fourth structured illumination parameter as a predicted structured illumination parameter of a second image subsection of the plurality of image subsections.

13. A non-transitory computer-readable medium having executable instructions stored thereon that, when executed by a processor, cause the processor to perform operations of:
capturing, at a structured illumination system, a first image of a sample;
estimating, using at least the captured first image, a first structured illumination parameter;
capturing, at the structured illumination system, a second image of the sample;
estimating, using at least the captured second image, a second structured illumination parameter; and predicting, using at least the first structured illumination parameter or the second structured illumination parameter, a third structured illumination parameter corresponding to a third image, wherein each of the first, second, and third structured illumination parameters comprises a phase, frequency, orientation, or modulation order.

14. The non-transitory computer-readable medium of claim 13, wherein the first image is captured at a first sample position, wherein the second image is captured at a second sample position, wherein the third image is captured at a third sample position between the first sample position and the second sample position, and wherein predicting the third structured illumination parameter comprises: predicting, using at least an interpolation method, the third structured illumination parameter at the third sample position.

15. The non-transitory computer-readable medium of claim 14, wherein the interpolation method comprises:
determining a rate of change from the first structured illumination parameter at the first sample position to the second structured illumination parameter at the second sample position; and
predicting, using at least the determined rate of change, the third structured illumination parameter at the third sample position.

16. The non-transitory computer-readable medium of claim 13, wherein the instructions when executed by the processor, cause the processor to further perform an operation of: constructing, using at least the third image and the third structured illumination parameter, a high resolution image.

17. The non-transitory computer-readable medium of claim 13, wherein the first image is captured at a first sample position, wherein the second image is captured at a second sample position, wherein the third image is captured at a third sample position, wherein the third sample position is after or before the first sample position and the second sample position, wherein predicting the third structured illumination parameter, comprises: predicting, using at least an extrapolation method, the third structured illumination parameter at the third sample position.

18. The non-transitory computer-readable medium of claim 17, wherein the instructions when executed by the processor, cause the processor to further perform an operation of: adjusting, using at least the third structured illumination parameter, a hardware component of the structured illumination system to compensate for changes in a structured illumination parameter prior to capturing an image at the third sample position.

19. The non-transitory computer-readable medium of claim 18, wherein the adjusted hardware component comprises: a rotating mirror to adjust a phase or orientation of a structured illumination pattern, a translation stage carrying a diffraction grating to adjust a phase or orientation of a structured illumination pattern, or a sample translation stage to adjust a phase or orientation of a structured illumination pattern.

20. The non-transitory computer-readable medium of claim 13, wherein the instructions when executed by the processor, cause the processor to further perform operations of:
storing in a memory of the structured illumination system: the first structured illumination parameter, the second structured illumination parameter, and the third structured illumination parameter; and
reducing, using one or more of the stored first structured illumination, stored second structured illumination parameter, stored third structured illumination parameter, and a stored value based on the known physical characteristics of the structured illumination system, a search space for a fourth structured illumination parameter for a fourth image.

21. A structured illumination imaging system, comprising:
a light emitter to emit light;
a beam splitter to split light emitted by the light emitter to project a structured illumination pattern on a plane of a sample;
a processor; and
a non-transitory computer-readable medium having executable instructions stored thereon that, when executed by the processor, cause the processor to perform operations of:
capturing a first image of a sample;
estimating, using at least the captured first image, a first structured illumination parameter;
capturing a second image of the sample;
estimating, using at least the captured second image, a second structured illumination parameter; and
predicting, using at least the first structured illumination parameter or the second structured illumination parameter, a third structured illumination parameter corresponding to a third image, wherein each of the first, second, and third structured illumination parameters comprises a phase, frequency, orientation, or modulation order.

22. A method, comprising:
capturing, at a structured illumination system, a first plurality of images of a sample;
estimating, at a computing device, using at least the captured first plurality of images, a first structured illumination parameter;
capturing, at the structured illumination system, a second plurality of images of the sample;
estimating, at the computing device, using at least the captured second plurality of images, a second structured illumination parameter; and
predicting, at the computing device, using at least the first structured illumination parameter or the second structured illumination parameter, a third structured illumination parameter corresponding to one or more images, wherein each of the first, second, and third structured illumination parameters comprises a phase, frequency, orientation, or modulation order.

* * * * *